United States Patent
Turgeman et al.

(10) Patent No.: US 10,037,421 B2
(45) Date of Patent: Jul. 31, 2018

(54) DEVICE, SYSTEM, AND METHOD OF THREE-DIMENSIONAL SPATIAL USER AUTHENTICATION

(71) Applicant: BioCatch Ltd., Tel Aviv (IL)

(72) Inventors: Avi Turgeman, Cambridge, MA (US); Ziv Levin, Tel Aviv (IL)

(73) Assignee: BIOCATCH LTD., Tel Aviv (IL)

( * ) Notice: Subject to any disclaimer, the term of this patent is extended or adjusted under 35 U.S.C. 154(b) by 243 days.

(21) Appl. No.: 15/186,545

(22) Filed: Jun. 20, 2016

(65) Prior Publication Data

US 2016/0300054 A1 Oct. 13, 2016

Related U.S. Application Data

(63) Continuation-in-part of application No. 15/182,624, filed on Jun. 15, 2016, and a continuation-in-part of (Continued)

(51) Int. Cl.
*G06F 21/00* (2013.01)
*G06F 21/36* (2013.01)
(Continued)

(52) U.S. Cl.
CPC ............. *G06F 21/36* (2013.01); *G06F 3/017* (2013.01); *G06F 3/0346* (2013.01);
(Continued)

(58) Field of Classification Search
CPC .................................. G06F 21/36; G06F 3/017
(Continued)

(56) References Cited

U.S. PATENT DOCUMENTS 3,618,019 A 11/1971 Nemirovsky et al.
3,699,517 A 10/1972 Dyche
(Continued)

FOREIGN PATENT DOCUMENTS

EP 2410450 1/2012
EP 2477136 7/2012
(Continued)

OTHER PUBLICATIONS

Ahmed et al., "A New Biometric Technology Based on Mouse Dynamics", Jul.-Sep. 2007, IEEE Transactions on Dependable and Secure Computing, vol. 4, No. 3, pp. 165-179.
(Continued)

*Primary Examiner* — Anthony Brown
(74) *Attorney, Agent, or Firm* — Eitan, Mehulal & Sadot

(57) ABSTRACT

Devices, systems, and methods of user authentication. A system includes a spatial challenge unit to distinguish between a human user and a non-human user. The spatial challenge unit requires the user to perform one or more spatial operations that modify the spatial properties of an electronic device operated by the user. Correct performance of the required spatial operations, indicates that the user is human. The system also includes a spatial password unit, which tracks a manner in which a human user handles the electronic device while the user enters a password; and then utilizes this user-specific manner for user authentication, by checking whether a manner in which the user enters his password matches a reference manner of password entry or a historical manner of password entry. The system also utilizes sequence of spatial operations or spatial gestures, as a pure spatial password or purely-spatial user-authentication factor.

11 Claims, 3 Drawing Sheets

Related U.S. Application Data application No. 14/325,397, filed on Jul. 8, 2014, application No. 15/186,545, which is a continuation-in-part of application No. 14/325,393, filed on Jul. 8, 2014, and a continuation-in-part of application No. 14/727,873, filed on Jun. 2, 2015, which is a continuation-in-part of application No. 14/566,723, filed on Dec. 11, 2014, now Pat. No. 9,071,969, which is a continuation of application No. 13/922,271, filed on Jun. 20, 2013, now Pat. No. 8,938,787, which is a continuation-in-part of application No. 13/877,676, filed as application No. PCT/IL2011/000907 on Nov. 29, 2011, now Pat. No. 9,069,942.

(60) Provisional application No. 62/190,264, filed on Jul. 9, 2015, provisional application No. 61/843,915, filed on Jul. 9, 2013, provisional application No. 61/417,479, filed on Nov. 29, 2010.

(51) Int. Cl.
| | | |
|---|---|---|
| *G06F 3/0481* | (2013.01) | |
| *G06F 3/0486* | (2013.01) | |
| *G06F 21/31* | (2013.01) | |
| *G06F 21/32* | (2013.01) | |
| *G07C 9/00* | (2006.01) | |
| *H04W 12/06* | (2009.01) | |
| *G06F 3/0488* | (2013.01) | |
| *G06F 3/0484* | (2013.01) | |
| *G06F 3/01* | (2006.01) | |
| *G06F 3/0346* | (2013.01) | |
| *H04L 29/06* | (2006.01) | |

(52) U.S. Cl.
CPC .......... *G06F 3/0481* (2013.01); *G06F 3/0486* (2013.01); *G06F 3/04842* (2013.01); *G06F 3/04886* (2013.01); *G06F 21/31* (2013.01); *G06F 21/316* (2013.01); *G06F 21/32* (2013.01); *G07C 9/00142* (2013.01); *H04L 63/08* (2013.01); *H04L 63/102* (2013.01); *H04L 63/1408* (2013.01); *H04W 12/06* (2013.01); *G06F 2221/2103* (2013.01); *G06F 2221/2131* (2013.01); *G06F 2221/2133* (2013.01); *H04L 63/0428* (2013.01); *H04L 63/083* (2013.01); *H04L 63/0861* (2013.01)

(58) Field of Classification Search
USPC ........................................................ 726/19
See application file for complete search history.

(56) References Cited

U.S. PATENT DOCUMENTS

| | | | |
|---|---|---|---|
| 3,983,535 A | 9/1976 | Herbst et al. | |
| 4,128,829 A | 12/1978 | Herbst et al. | |
| 4,621,334 A | 11/1986 | Garcia | |
| 4,760,386 A | 7/1988 | Heath et al. | |
| 4,805,222 A | 2/1989 | Young et al. | |
| 5,485,171 A | 1/1996 | Copper et al. | |
| 5,557,686 A | 9/1996 | Brown et al. | |
| 5,838,306 A | 11/1998 | O'Connor et al. | |
| 5,874,941 A | 2/1999 | Yamada | |
| 6,337,686 B2 | 1/2002 | Wong et al. | |
| 6,337,919 B1 | 1/2002 | Dunton | |
| 6,572,014 B1 | 6/2003 | Lambert | |
| 6,819,219 B1 | 11/2004 | Bolle | |
| 6,938,061 B1 | 8/2005 | Rumynin et al. | |
| 6,938,159 B1 | 8/2005 | O'Connor et al. | |
| 6,957,185 B1 | 10/2005 | Labaton | |
| 6,957,186 B1 | 10/2005 | Guheen et al. | |
| 6,983,061 B2 | 1/2006 | Ikegami et al. | |
| 7,130,452 B2 | 10/2006 | Bolle et al. | |
| 7,133,792 B2 | 11/2006 | Murakami et al. | |
| 7,139,916 B2 | 11/2006 | Billingsley et al. | |
| 7,245,218 B2 | 7/2007 | Ikehara et al. | |
| 7,494,061 B2 | 2/2009 | Reinhold | |
| 7,523,191 B1 | 4/2009 | Thomas et al. | |
| 7,606,915 B1 | 10/2009 | Calinov et al. | |
| 7,796,013 B2 | 9/2010 | Murakami et al. | |
| 7,818,290 B2 | 10/2010 | Davis et al. | |
| 8,417,960 B2 | 4/2013 | Takahashi et al. | |
| 8,433,785 B2 | 4/2013 | Awadallah et al. | |
| 8,510,113 B1 | 8/2013 | Conkie et al. | |
| 8,548,208 B2 | 10/2013 | Schultz | |
| 8,990,959 B2* | 3/2015 | Zhu ........................ | G06T 19/20 345/419 |
| 9,154,534 B1 | 10/2015 | Gayles et al. | |
| 9,174,123 B2 | 11/2015 | Nasiri et al. | |
| 9,282,112 B2 | 3/2016 | Filatov | |
| 9,301,140 B1 | 3/2016 | Costigan et al. | |
| 9,304,915 B2 | 4/2016 | Adams et al. | |
| 2001/0004733 A1 | 6/2001 | Eldering | |
| 2002/0089412 A1 | 7/2002 | Heger et al. | |
| 2003/0033526 A1 | 2/2003 | French et al. | |
| 2003/0074201 A1 | 4/2003 | Grashey et al. | |
| 2003/0212811 A1 | 11/2003 | Thornton | |
| 2004/0015714 A1 | 1/2004 | Abraham et al. | |
| 2004/0062423 A1 | 4/2004 | Doi | |
| 2004/0111523 A1 | 6/2004 | Hall et al. | |
| 2005/0008148 A1 | 1/2005 | Jacobson | |
| 2005/0179657 A1 | 8/2005 | Russo et al. | |
| 2005/0289264 A1 | 12/2005 | Illowsky et al. | |
| 2006/0006803 A1 | 1/2006 | Huang et al. | |
| 2006/0143454 A1 | 6/2006 | Walmsley | |
| 2006/0195328 A1 | 8/2006 | Abraham et al. | |
| 2006/0215886 A1 | 9/2006 | Black | |
| 2006/0224898 A1 | 10/2006 | Ahmed | |
| 2006/0282660 A1 | 12/2006 | Varghese et al. | |
| 2006/0284969 A1 | 12/2006 | Kim et al. | |
| 2007/0183633 A1 | 8/2007 | Hoffmann | |
| 2007/0214426 A1 | 9/2007 | Ruelle et al. | |
| 2007/0255821 A1 | 11/2007 | Ge et al. | |
| 2007/0266305 A1 | 11/2007 | Cong et al. | |
| 2007/0271466 A1 | 11/2007 | Mak et al. | |
| 2007/0283416 A1 | 12/2007 | Renaud | |
| 2008/0091639 A1 | 4/2008 | Davis et al. | |
| 2008/0092209 A1 | 4/2008 | Davis et al. | |
| 2008/0162449 A1 | 7/2008 | Chao-Yu et al. | |
| 2008/0183745 A1 | 7/2008 | Cancel et al. | |
| 2008/0211766 A1 | 9/2008 | Westerman et al. | |
| 2008/0215576 A1 | 9/2008 | Zhao et al. | |
| 2008/0301808 A1 | 12/2008 | Calo et al. | |
| 2009/0089879 A1 | 4/2009 | Wang et al. | |
| 2009/0094311 A1 | 4/2009 | Awadallah et al. | |
| 2009/0189736 A1 | 7/2009 | Hayashi | |
| 2009/0199296 A1 | 8/2009 | Xie et al. | |
| 2009/0254336 A1 | 10/2009 | Dumais et al. | |
| 2009/0293119 A1 | 11/2009 | Jonsson | |
| 2009/0320123 A1* | 12/2009 | Yu .......................... | G06F 21/316 726/16 |
| 2010/0042403 A1 | 2/2010 | Chandrasekar et al. | |
| 2010/0046806 A1 | 2/2010 | Baughman et al. | |
| 2010/0077470 A1 | 3/2010 | Kozat et al. | |
| 2010/0082747 A1 | 4/2010 | Yue et al. | |
| 2010/0082998 A1 | 4/2010 | Kohavi | |
| 2010/0122082 A1 | 5/2010 | Deng et al. | |
| 2010/0125816 A1 | 5/2010 | Bezos | |
| 2010/0281539 A1 | 11/2010 | Burns et al. | |
| 2010/0328074 A1 | 12/2010 | Johnson et al. | |
| 2011/0012829 A1 | 1/2011 | Yao | |
| 2011/0016320 A1 | 1/2011 | Bergsten et al. | |
| 2011/0023115 A1 | 1/2011 | Wright | |
| 2011/0029902 A1 | 2/2011 | Bailey | |
| 2011/0063211 A1 | 3/2011 | Hoerl et al. | |
| 2011/0065504 A1 | 3/2011 | Dugan et al. | |
| 2011/0102570 A1 | 5/2011 | Wilf et al. | |
| 2011/0113388 A1 | 5/2011 | Eisen et al. | |
| 2011/0154273 A1 | 6/2011 | Aburada et al. | |
| 2011/0162076 A1 | 6/2011 | Song et al. | |
| 2011/0191820 A1 | 8/2011 | Ivey | |

(56) References Cited

U.S. PATENT DOCUMENTS

| | | |
|---|---|---|
| 2011/0193737 A1 | 8/2011 | Chiueh |
| 2011/0202453 A1 | 8/2011 | Issa et al. |
| 2011/0246902 A1 | 10/2011 | Tsai et al. |
| 2011/0251823 A1 | 10/2011 | Davis et al. |
| 2011/0271342 A1 | 11/2011 | Chung et al. |
| 2011/0276414 A1 | 11/2011 | Subbarao et al. |
| 2012/0005483 A1 | 1/2012 | Patvarczki et al. |
| 2012/0054834 A1 | 3/2012 | King |
| 2012/0096555 A1 | 4/2012 | Mahaffey |
| 2012/0133055 A1 | 5/2012 | Machida |
| 2012/0154173 A1 | 6/2012 | Chang et al. |
| 2012/0154273 A1 | 6/2012 | Mcdade et al. |
| 2012/0154823 A1 | 6/2012 | Sakamoto |
| 2012/0167170 A1 | 6/2012 | Shi |
| 2012/0218193 A1 | 8/2012 | Weber et al. |
| 2012/0278804 A1 | 11/2012 | Narayanasamy et al. |
| 2013/0036416 A1 | 2/2013 | Raju et al. |
| 2013/0097682 A1 | 4/2013 | Zeljkovic et al. |
| 2013/0097706 A1 | 4/2013 | Titonis et al. |
| 2013/0111586 A1 | 5/2013 | Jackson |
| 2013/0133055 A1 | 5/2013 | Ali et al. |
| 2013/0135218 A1 | 5/2013 | Jain |
| 2013/0154999 A1 | 6/2013 | Guard |
| 2013/0167212 A1 | 6/2013 | Azar et al. |
| 2013/0305357 A1 | 11/2013 | Ayyagari et al. |
| 2014/0033317 A1 | 1/2014 | Barber |
| 2014/0078061 A1 | 3/2014 | Simons et al. |
| 2014/0078193 A1 | 3/2014 | Barnhoefer et al. |
| 2014/0082369 A1 | 3/2014 | Waclawsky et al. |
| 2014/0143304 A1 | 5/2014 | Hegarty et al. |
| 2014/0196119 A1 | 7/2014 | Hill et al. |
| 2014/0200953 A1 | 7/2014 | Mun |
| 2014/0250538 A1 | 9/2014 | Rapaport et al. |
| 2014/0259130 A1 | 9/2014 | Li et al. |
| 2014/0283059 A1 | 9/2014 | Sambamurthy et al. |
| 2014/0317734 A1 | 10/2014 | Valencia et al. |
| 2014/0344927 A1 | 11/2014 | Turgeman et al. |
| 2015/0012920 A1 | 1/2015 | De Santis et al. |
| 2015/0101031 A1 | 4/2015 | Harjanto et al. |
| 2016/0006800 A1 | 1/2016 | Summers et al. |
| 2016/0042164 A1 | 2/2016 | Goldsmith et al. |
| 2016/0164905 A1 | 6/2016 | Pinney Wood et al. |
| 2016/0164906 A1 | 6/2016 | Pinney Wood et al. |
| 2017/0048272 A1 | 2/2017 | Yamamura et al. |

FOREIGN PATENT DOCUMENTS

| | | |
|---|---|---|
| EP | 2610776 | 7/2013 |
| WO | 2007146437 | 12/2007 |
| WO | 2012073233 | 6/2012 |

OTHER PUBLICATIONS

Bailey, Kyle O., "Computer Based Behavioral Biometric Authentication Via Multi-Modal Fusion", Thesis, 2013, Air Force Insitute of Technology.

Stinson et al., "Characterizing Bots' Remote Control Behavior". Detection of Intrusions and Malware, and Vulnerability Assessment. Springer Berlin Heidelberg, p. 89-108. Dec. 31, 2007.

Todorov, "Optimality Principles in Sensorimotor Control (Review)", Sep. 2004, Nature Neuroscience 7, pp. 907-915.

Cleeff et al., "Security Implications of Virtualization: A Literature Study", Science and Engineering, 2009.

Hibbeln et al., "Detecting Deception in Online Environments: Measuring Fraud Through Mouse Cursor Movements", Jun. 7, 2014, Gmunden Retreat on NeuroIS 2014 Gmunden Austria, p. 38.

Ferrie Peter, "Attack on Virtual Machine Emulators", Symantec Technology Exchange, 2007.

Yampolskiy et al., "Behavioural Biometrics: a survey and classification", 2008, International Journal of Biometrics, vol. 1, No. 1, pp. 81-113.

Provos et al., 2007, "The Ghost in the Browser: Analysis of Web-based Malware".

Huang Yao-Wen et al., "Web application security assessment by fault injection and behavior monitoring", 2003, Proceedings of the 12th international conference on World Wide Web, ACM.

Emmanouil Vasilomanolakis, "A honeypot-driven cyber incident monitor: Lessons learned and steps ahead"; Sep. 2015; SIN '15: Proceedings of the 8th International Conference on Security of Information and Networks; Publisher: ACM; pp. 1-7.

Franklin et al., "Remote Detection of Virtual Machine Monitors with Fuzzy benchmarking", ACM SIGOPS Operating Systems Review, V42, Issue 3, Apr. 2008.

Georgia Frantzeskou et al., "Identifying Authorship by Byte-Level N-Grams: The source Code Author Profile (SCAP) Method", Spring 2007, International Journal of Digital Evidence, vol. 6, issue 1.

Liston et al., "On the Cutting Edge: Thwarting Virtual Machine Detection"; retrieved from the Internet on May 3, 2017, from: http://docplayer.net/9791309-On-the-cutting-edge-thwarting-virtual-machine-detection.html.

Zheng et al., "An Efficient User Verification System via Mouse Movements", Oct. 17-21, 2011, CCS' 11, Chicago, Illinois.

Tavis Ormandy, "An Empirical Study into the Security Exposure to Hosts of Hostile Virtualized Environments", retrieved from the Internet on May 3, 2017, from: http://taviso.decsystem.org/virtsec.pdf.

Spafford et al., "Software Forensics: Can We Track Code to its Authors?", Feb. 1992, Computer Science Technical Report, Purdue e-Pubs, Report No. CSD-TR-92-010.

Garfinkel and Rosenblum, "A virtual Machine Introspection-Based Architecture for Intrusion Detection.", 2003, Proc. Network and Distributed Systems Security Symp., The Internet Society, pp. 191-206.

Nance et al., "Virtual Machine Introspection", IEEE Security & Privacy, 2008.

Nakkabi et al., "Improving Mouse Dynamics Biometric Performance Using Variance Reduction via Extractors with Separate Features", Nov. 2010, IEEE Transactions on System, Man, and Cybernetics; vol. 40, No. 6.

International Search Report for application PCT/IL2011/000907 dated Apr. 19, 2012.

International Search Report for application PCT/IB2014/062293 dated Oct. 1, 2014.

International Search Report for application PCT/IB2014/062941 dated Dec. 17, 2014.

International Search Report for application PCT/IB2016/054064 dated Nov. 21, 2016.

* cited by examiner

DEVICE, SYSTEM, AND METHOD OF THREE-DIMENSIONAL SPATIAL USER AUTHENTICATION

CROSS-REFERENCE TO RELATED APPLICATIONS

This application claims priority and benefit from U.S. provisional patent application No. 62/190,264, filed on Jul. 9, 2015, which is hereby incorporated by reference in its entirety.

This application is a Continuation-in-Part (CIP) of U.S. patent application Ser. No. 15/182,624, filed on Jun. 15, 2016, which is hereby incorporated by reference in its entirety.

This application is a Continuation-in-Part (CIP) of U.S. patent application Ser. No. 14/325,397, filed on Jul. 8, 2014, which is hereby incorporated by reference in its entirety. The above-mentioned U.S. patent application Ser. No. 14/325,397 claims priority and benefit from U.S. provisional patent application No. 61/843,915, filed on Jul. 9, 2013, which is hereby incorporated by reference in its entirety.

This application is a Continuation-in-Part (CIP) of U.S. patent application Ser. No. 14/325,393, filed on Jul. 8, 2014, which is hereby incorporated by reference in its entirety.

This application is a Continuation-in-Part (CIP) of U.S. patent application Ser. No. 14/727,873, filed on Jun. 2, 2015, which is hereby incorporated by reference in its entirety. The above-mentioned patent application Ser. No. 14/727,873 is a Continuation-in-Part (CIP) of U.S. patent application Ser. No. 14/566,723, filed on Dec. 11, 2014, now U.S. Pat. No. 9,071,969; which is a Continuation of U.S. patent application Ser. No. 13/922,271, filed on Jun. 20, 2013, now U.S. Pat. No. 8,938,787; which is a Continuation-In-Part (CIP) of U.S. patent application Ser. No. 13/877,676, filed on Apr. 4, 2013, now U.S. Pat. No. 9,069,942; which is a National Phase filing of PCT International Application number PCT/IL2011/000907, filed on Nov. 29, 2011, published as International Publication number WO/2012/073233; which claims priority and benefit from U.S. provisional patent application No. 61/417,479, filed on Nov. 29, 2010; and all the above-mentioned patent applications are hereby incorporated by reference in their entirety.

FIELD

The present invention is related to the field of security of electronic devices and systems.

BACKGROUND

Millions of people utilize mobile and non-mobile electronic devices, such as smartphones, tablets, laptop computers and desktop computers, in order to perform various activities. Such activities may include, for example, browsing the Internet, sending and receiving electronic mail (email) messages, taking photographs and videos, engaging in a video conference or a chat session, playing games, or the like.

Some activities may be privileged, or may require authentication of the user in order to ensure that only an authorized user engages in the activity. For example, a user may be required to enter a username and a password in order to access an email account, or in order to access an online banking interface or website.

SUMMARY

The present invention may include, for example, systems, devices, and methods for differentiating or distinguishing between a human user and a non-human user (e.g., an automated script, automatic script, "bot", malware). Such differentiating may be performed as part of a user authentication process or as part of a log-in or sign-in process to a computerized service or system (e.g., during, or as part of, a log-in of a user into an electronic commerce website or service, or into an online banking website or service). Such differentiating may also be performed not as part of a log-in process; for example, when a user submits an excessive number of queries to a search engine or to another online service, or when the user attempts to download an excessive number of files or items from an online repository, or the like.

The present invention may further include, for example, systems, devices, and methods for authenticating a user by taking into account, at least, one or more three-dimensional spatial characteristics of an electronic device that is used for user authentication, and/or one or more changes in the three-dimensional characteristics of an electronic device that is used for user authentication.

The present invention may provide other and/or additional benefits or advantages.

DETAILED DESCRIPTION OF THE PRESENT INVENTION

The term "password" as used herein may be or may comprise, for example, a password or pass-phrase or Personal Identification Number (PIN), or other data-item or secret, or other confidential data-item, which may be used for user authentication or for logging-in or sign-in of a user into an electronic device (e.g., smartphone, tablet, smart-watch, laptop computer, desktop computer) or a service (e.g., banking service or website, brokerage service or website, email account, web-mail, social network, online vendor, online merchant, electronic commerce website or application or "app"), or other data-item or string that may be used as authentication factor or authentication step (e.g., in a single-step or multiple-step authentication process), or other log-in data that may be used in order to authorized access to a privileged service and/or to a privileged location (e.g., entry into, or exit from, or passage through a gate or card-reader or turnstile), or other log-in data item that may be used in order to authorize a user to perform privileged actions (e.g., to unlock or open a device or a vehicle; to start or ignite a vehicle; to drive a vehicle).

The terms "service" or "computerized service", as used herein, may be or may comprise any suitable service, or system, or device, which may require user authentication in order to authorize user access to it, or in order to authorize performance of one or more particular actions; including, but not limited to, for example, user authentication for accessing or operating or unlocking an electronic device (e.g., smartphone, tablet, smart-watch, laptop computer, desktop computer, smart-home device or appliance, Internet of Things (IoT) device) or service (e.g., banking service or website, brokerage service or website, email account, webmail, social network, online vendor, online merchant, electronic commerce website or application or "app"), or other system or platform that requires user authentication (e.g., entry into, or exit from, or passage through a gate or card-reader or turnstile; to unlock or open a device or a vehicle; to start or ignite a vehicle; to drive a vehicle).

Figure 1:
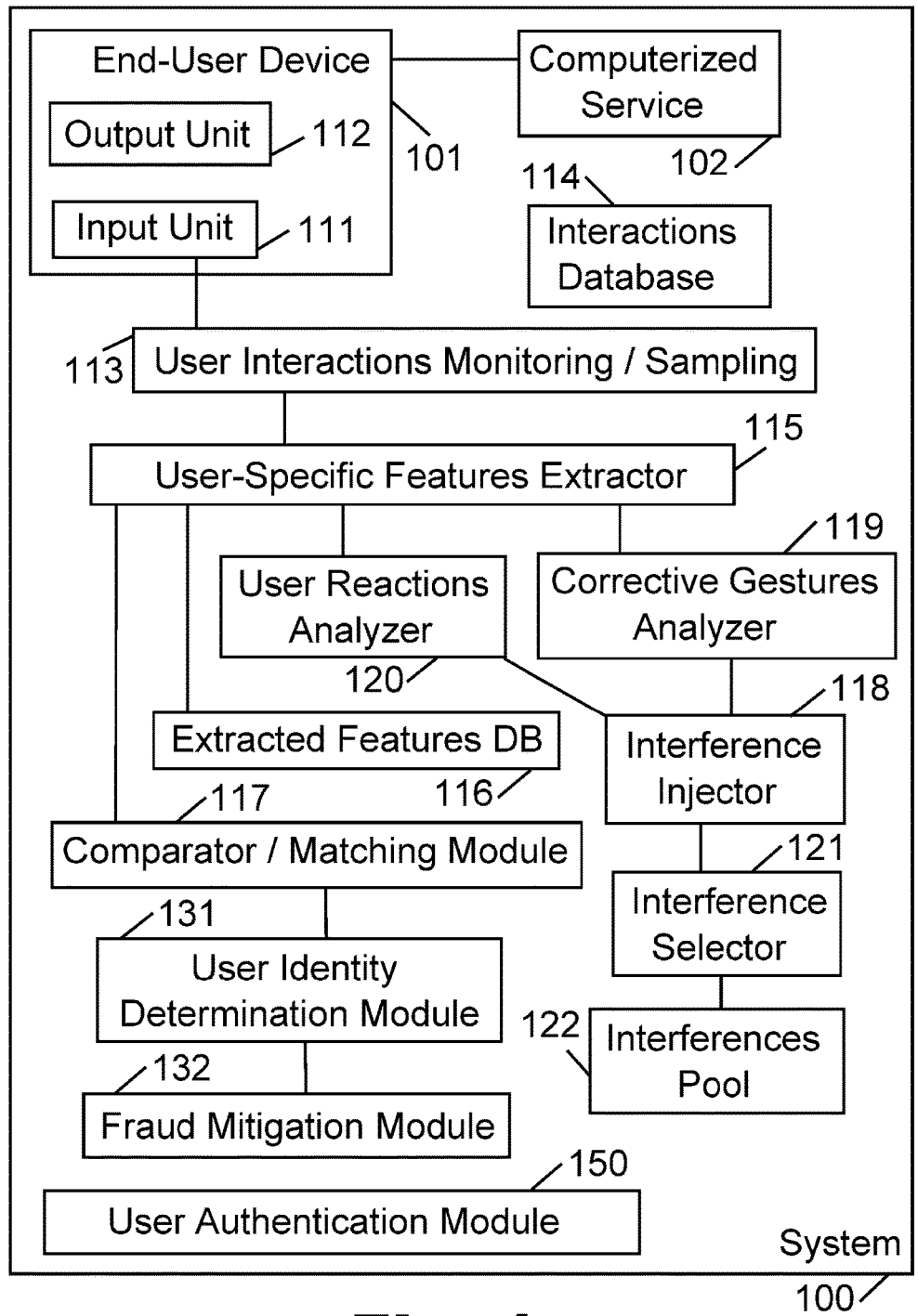
FIG. 1 is a schematic block-diagram illustration of a system, in accordance with some demonstrative embodiments of the present invention.

Reference is made to FIG. 1, which is a schematic block-diagram illustration of a system 100 in accordance with some demonstrative embodiments of the present invention. The components of system 100 may be implemented by using suitable hardware units and/or software units; and may be co-located within a single computer device or a single computing system, or may be scattered or distributed across two or more computing devices and/or computing systems. In some embodiments, client-server architecture may be used; such that some of the components and units may be implemented locally at the end-user device, whereas other components and units may be implemented remotely or by using a remote server or a "cloud computing" server or repository or computer. In some embodiments, some modules and functionality may be implemented by utilizing a web-browser, a plug-in or extension or add-on to a web-browser or to an Operating System (OS), by using a native application or a mobile-web application, by using JavaScript and/or CSS and/or HTML5, and/or by using other suitable technologies. Components of system 100 may interact or communicate over one or more wireless communication links, wired communication links, cellular communication, client/server communication, peer-to-peer communication, or the like.

System 100 may enable an end-user device 101 to interact with a computerized service 102. The end-user device 101 may be, for example, a smartphone, a tablet, a laptop computer, a notebook computer, a desktop computer, a cellular phone, a smart-watch (e.g., Apple iWatch), a fitness bracelet (e.g., similar to FitBit or JawBone wearable devices), a wearable device, a portable device, an Augmented Reality (AR) device or glasses or helmet or headgear (e.g., similar to Google Glass), a Virtual Reality (VR) device or glasses or helmet or headgear (e.g., similar to Oculus Rift), or the like. In some embodiments, the end-use device 101 may be a stand-alone machine or interface; a digital kiosk or kiosk-type machine, a vending machine, an Automated Teller Machine (ATM), a point-of-sale (POS) terminal or machine, or the like. In some embodiments, the end-user device 101 may be a point-of-entry terminal, or a user-identification terminal, such as a terminal or scanner or dashboard or touch-screen which may be used for secure physical entry or entrance or passage through a gate or door or lobby or turnstiles or room or corridor, or as part of (or replacement of) a physical entry monitoring system. In yet other embodiments, the end-user device 101 may be or may comprise, or may be comprised in, a vehicle, a vehicular device, a dashboard, a vehicular dashboard, a vehicular computing system, a vehicular computing device, a vehicular ignition unit or system, a vehicular component that is operable in conjunction with a vehicular ignition system, a vehicular immobilizer unit, a vehicular component that is operable in conjunction with a vehicular immobilizer unit, or the like.

The computerized service 102 may be a local and/or a remote computerized platform or service or application or web-site or web-page. The computerized service may be installed locally and entirely on the end-user device 101; or may be installed remotely and entirely on a remote server or a remote computer which is then accessed by the end-user device 101 either via one or more wired and/or wireless communication link(s); or may be a hybrid implementation which utilizes one or more remote components (e.g., a remote Application Server) and one or more local components (e.g., a local native application; a local mobile-web application; a local web-browser).

Some demonstrative and non-limiting examples, of suitable computerizes service(s) which may be used in conjunction with the present invention, may include: banking service, online banking services, retail banking services (e.g., performed within or at an ATM or a branch of a bank); brokerage or online brokerage services; usage and/or access to electronic mail, email, SMS accounts, instant messaging (IM) accounts and services, social networks; an enterprise network or corporate network or organizational network which is available only to employees or authorized users of an organization or enterprise; a members-only network or service, or a paying-members-only service or network, or a premium service, which are available only to certain users and/or to members and/or to paying users; applications and/or websites and/or services that enable or perform payment, electronic payment, utilization of credit card and/ or debit card and/or wire transfer and/or electronic funds transfer; applications that access or utilize a secure database storing confidential or non-public information; and/or any suitable electronic service which may be accessed locally and/or remotely by end-user device 101.

In some embodiments, the computerized service 102 need not be external to the end-user device 101, and may be entirely internal to the end-user device 101, or may be the end-user device 101, or may be a particular functionality or a general functionality of the end-user device 101. For example, the end-user device may be a smartphone or tablet; and the computerized service 102 may be one or more features or functionalities or applications of that smartphone or tablets. In some embodiments, the present invention may be used as part of a locking or unlocking mechanism of a smartphone or tablet or other end-user device 101; or as part of a process in which a user unlocks or "wakes up" a hibernating device, or takes the device from reduced-power mode (or from "sleep mode") to fully-operational mode.

End-user device comprises an input unit 111, for example, mouse, keyboard, stylus, touch-screen, multi-touch-screen, trackball, joystick, or the like. End-user device further comprises an output unit 112, for example, monitor, screen, touch-screen, multi-touch-screen, or the like. In some embodiments, the input unit and the output unit may be implemented as the same single unit, for example, as a touch-screen or multi-touch screen.

A user interactions monitoring/sampling module 113 may monitor some or all of the user interactions and/or user gestures; and may record, capture, or otherwise sample such interactions and/or gestures. Optionally, an interactions database 114 may log and/or may store data reflecting the monitored user interactions, for a single user or for multiple users.

User-specific features extractor 115 may extract or estimate user-specific features or traits or characteristics or attributes, that characterize an interaction (or a set or batch or group or flow of interactions, or a session of interactions) of a user with the computerized service 102. Optionally, an extracted features database 116 may store data or records which reflects users and their respective values of extracted (or estimated) user-specific features.

Optionally, a comparator/matching module 117 may compare or match, between (or among): (a) values of user-specific features that are extracted in a current user session (or user interaction), and (b) values of respective previously-captured or previously-extracted user-specific features (of the current user, and/or of other users, and/or of pre-defined sets of values that correspond to known automated scripts or "bots" or known attackers).

The user-specific features, whose values may be compared or matched across usage-sessions, may include, for example, curvature (or curvature radius) of mouse movement or mouse strokes; acceleration and/or speed of mouse movement in one or more directions; smoothness of movement; velocity or speed of gestures; acceleration or deceleration of gestures; rate or frequency of mouse clicks; accuracy or inaccuracy of gestures or clicks, or their relative location (e.g., whether the user typically clicks correctly an on-screen button, or sometimes misses the button and clicks nearby); the particular type of manner that the user chose to convey input (e.g., whether the user clicked on "submit" button, or pressed the "enter" key; or, whether the use moved between form fields by using the "tab" key or by using the mouse cursor); particular sequences of keys or characters that the user enters more rapidly (or more slowly) relative to other characters or sequences; particular manner or pattern in which the user navigates within fields or within a page or an application; and/or other suitable features, for example: device movements or input-unit movement during interaction, movement and/or orientation and/or acceleration of the entire device (e.g., a smartphone or tablet) during the interaction, whether one single finger or multiple particular fingers are used for interacting, the relations between fingers while interacting, the relation to other body parts while interacting, and/or other suitable gesture parameters. Optionally a deep learning algorithm and/or a machine learning algorithm or other suitable Artificial Intelligence (A.I.) algorithm may be utilized, in order to learn and to define a user-specific profile based on the data that is monitored or produced during the interaction (and optionally, immediately prior to the interaction and/or immediately after the interaction); optionally, without necessarily using any specific pre-define features or characteristics or features, and optionally using a heuristic approach or holistic approach or "fuzzy logic" algorithm that attempts to find a unique identifier or a unique digital footprint without necessarily being tied to a specific biometric parameter or to a set of pre-defined biometric parameters. Some embodiments may thus generate a user-specific biometric profile or biometric signature, without pre-defining a set of biometric characteristics or parameters that are then used to calculate the signature or profile; but rather, by utilizing deep learning which utilizes mathematical generation of a unique profile or signature without necessarily defining or pre-defining the set of physical parameters that would be used for differentiating among users.

Optionally, an interference injector 118 may operate to introduce, add, inject, generate and/or otherwise cause an interference (or anomaly, or aberration, or inconsistency, or deviation, or input-output interference, or input/output anomaly) to the input and/or the output as they are reflected to the user who utilizes the end-user device. Such intentionally-introduced input/output interference may be, for example: temporarily hiding or removing the on-screen mouse-pointer or on-screen pointer, in order to elicit the user to react and to make gestures in an attempt to revive the hidden on-screen pointer; intentional deviations or "jumps" in the movement of the on-screen pointer, relative to the actual manual gesture that is performed by the human user (e.g., the human user drags the mouse eastbound, but the on-screen pointer deviates and moves north-east, thereby eliciting a corrective movement or corrective gestures by the user); intentionally moving or re-locating an on-screen interface component (e.g., a "submit" button or a "next" button) while the user is dragging an on-screen pointer; and/or other suitable interferences or anomalies, whose goal is to elicit the user to react and/or to perform corrective steps or corrective gestures; thereby enabling the user-specific features extractor 115 to further extract user-specific attributes or features that characterizes such corrective gestures or such reactions to anomalies; e.g., the time period that it takes the user to notice the anomaly and/or to correct it; the manner in which the user corrects the anomaly (e.g., whether the user tries to locate a disappeared on-screen pointer, by shaking his mouse, or by moving the mouse sideways, or by moving the mouse clockwise, or by moving the mouse counter-clockwise, or by clicking the mouse-button once, or by clicking the mouse-button multiple times, or by typing on the keyboard.

In some embodiments, a corrective gestures analyzer unit 119 may monitor, track, analyze and/or characterize such corrective actions or gestures of the user in response to such interference or anomaly or aberration. In some embodiments, a user reaction analyzer unit 120 may monitor, track, analyze and/or characterize such gestures or reactions of the user in response to such interference (which may not necessarily involve a corrective action). In some embodiments, these functionalities, of the corrective gestures analyzer unit 119 and/or the user reaction analyzer unit 120 may be part of the functionality of the user-specific features extractor 115.

It is noted that in some embodiments, interferences may be injected or used continuously; or may be used only in particular portions or regions of the computerized service (e.g., only on certain pages of a website, or only when certain functionalities of the application are requested, such as high-risk or higher-risk functions); or may be injected pseudo-randomly, or at pre-defined time intervals; or may be injected if one or more other conditions are true (e.g., if there are other indicators of fraudulent activity or irregular activity); or may not be injected at all, for a particular user or for a particular usage-session, or for all users or for a group of users. In some embodiments, optionally, an interference selector module 121 may select or may determine, based on one or more criteria or conditions, whether or not to introduce an interference, or whether (or when exactly, or where exactly) to trigger or to command the interference generator 118 to generate an interference; optionally by selecting a suitable interference from a pre-defined interferences pool 122. For example, the interference selection may be based on user characteristics, and/or based on attributes of the computerized service, and/or based on pseudo-random selection; or by selecting interferences of a type that was not yet used for a particular user, or conversely by selecting interferences of a type that had been already used for a particular user, or by taking into account the level of risk associated with a user-requested functionality of the computerizes service, or the like. The injection of interferences, and/or the analysis of user reactions to interference, and/or the analysis of corrective gestures, may be optional.

If the comparator/matching module 117 determines that one or more features, or a set of features, that characterize the current interaction session of the current user, does not match those features as extracted in previous interaction session(s) of that user, then, a possible-fraud signal may be generated or sent or transmitted to other units of system 100 and/or to pre-defined recipients.

For example, combined factors and data may be taken into account by a user identity determination module 131, which may determine or estimate whether or not the current user is a "fraudster" or an attacker or an imposter. The user identity determination module 131 may trigger or activate a fraud mitigation module 132 able to perform one or more fraud mitigating steps based on that determination or estimation; for example, by requiring the current user to respond to a challenge, to answer security question(s), to contact customer service by phone, to perform two-step authentication or two-factor authentication, or the like.

In accordance with the present invention, system 100 may comprise a user authentication module 150 which may enable system 100 and/or computerized service 102 and/or end-user device 101 to perform user authentication, or to authenticate or verify or confirm the identity of a user of end-user device 101 (or of computerized service 102), and/or to utilize the unique gestures and/or reactions of the user as a user-identifying feature that may authorize a log-in or may authorize access or may authorize a password recover or a password reset process.

The user authentication module 150 may further enable a user to perform password recovery or password reset, or other user-authentication factor recovery or user-authentication factor reset or user-authentication factor replacement, without requiring the user to remember or to submit one or more secret or confidential data-items, and/or without requiring the user to remember or to submit correct answers to previously-defined security questions.

Figure 2:
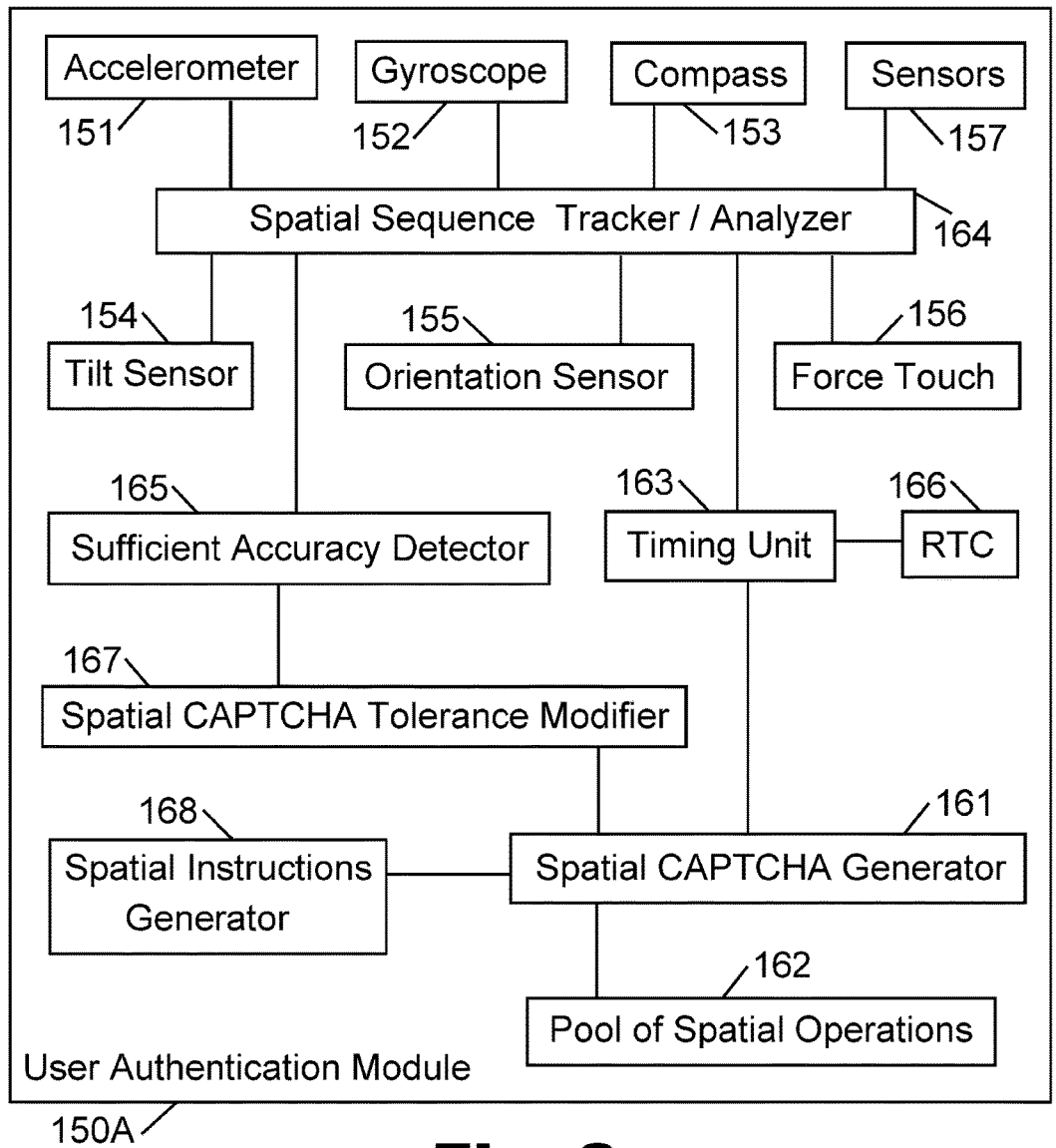
FIG. 2 is a schematic block-diagram illustration of a user authentication module, in accordance with some demonstrative embodiments of the present invention.

Reference is made to FIG. 2, which is a schematic block-diagram illustration of user authentication module 150A and its associated components, in accordance with some demonstrative embodiments of the present invention. The user authentication module 150A of FIG. 2 may be a demonstrative example of the user authentication module 150 of FIG. 1; or may be comprised in, or may operate in conjunction with, the user authentication module 150 of FIG. 1.

User authentication module 150A may be utilized to enable Spatial or Three-Dimensional CAPTCHA or mechanism for differentiating between a human user and a non-human user (e.g., a computerized script, automated script or program, automatic script, "bot", malware).

The Applicants have realized that various conventional implementations of the CAPTCHA mechanism ("completely automated public Turing test to tell computers and humans apart") may be annoying or time-consuming for human users, and/or may be error-prone for human users, who often fail to correctly decipher a distorted version of a word or a phrase presented on the screen.

The Applicants have further realized that conventional CAPTCHA mechanisms may be bypassed by some automated scripts, which may perform high-quality Optical Character Recognition (OCR) of distorted text, and may still reasonably estimate the required text.

The Applicants have devised a new CAPTCHA mechanism and system, that may replace conventional CAPTCHA mechanisms, or may augment or be added to conventional CAPTCHA mechanisms in order to make them stronger and less susceptible to automated attacks.

In accordance with the present invention, spatial information of the computing device or electronic device, which is utilized for performing the CAPTCHA challenge or task, may be utilized as a part of the CAPTCHA mechanism.

In a demonstrative embodiment, an electronic device (e.g., smartphone, tablet, laptop, smart-watch) may comprise one or more accelerometers, one or more gyroscopes, one or more compass modules, one or more sensors, one or more modules able to determine acceleration and/or deceleration and/or orientation and/or position and/or location, one or more sensors able to determine tilt and/or angular orientation of the electronic device, one or more sensors able to determine whether the electronic device is horizontal or vertical or tilted or slanted (e.g., relative to the ground, or relative to another plane of reference), one or more sensors able to determine whether the electronic device is being rotated or is spinning or is positioned (or moving) upside-down or is positioned (or moving) sideways, one or more sensors able to determine physical pressure applied by a user onto or into or towards a particular region or component of the electronic device (e.g., a "Force Touch" touch-screen able to sense or measure the amount of force applied by the user to the touch-screen), and/or other spatial or three-dimensional properties of the electronic device and/or its position and/or its orientation and/or its movement, and/or changes or modifications in such spatial or three-dimensional properties of the electronic device. For demonstrative purposes, user authentication module 150A is depicted to show some demonstrative sensors, for example, an accelerometer 151, a gyroscope 152, a compass 153, a tilt sensor 154, an orientation sensor 155, and a Force Touch touch-screen 156; other suitable types of sensors may be used, and they are depicted (and may be referred to) as sensors 157.

Accordingly, a novel CAPTCHA mechanism in accordance with the present invention, may request the user (e.g., via a textual command displayed on the screen; via audible instructions conveyed as audio; by showing a video-clip or animation demonstrating the requested gestures), to perform one or more physical or spatial operations, or physical or spatial movements, or physical or spatial gestures or patterns, that would affect or modify the spatial or three-dimensional properties of the electronic device. For example, a Spatial CAPTCHA Generator 161 may generate a CAPTCHA challenge that requires the user to perform one or more spatial operations on the electronic device, or that require the user to otherwise perform operations that modify or affect the spatial properties of the electronic device (e.g., its acceleration, its altitude, its velocity, its orientation or tilt, its slanting, or the like).

The Spatial CAPTCHA challenge may be inserted or injected or added, for example, into a web-site, web-page, application, mobile application or "app", an online service, an electronic commerce site or service, an online banking service, a search engine, a web-page or service that enables a user to submit a query or to upload a file, a web-page or service that enables a user to download data or files, or the like.

Optionally, the Spatial CAPTCHA Generator 161 may construct or generate the Spatial CAPTCHA challenge by selecting one or more operations from a Pool of Spatial Operations 162, and arranging them in a particular order. Optionally, a Timing Unit 163 may determine a suitable a time-slot that would be allocated to performing the Spatial CAPTCHA challenge, for example, a time-slot that is estimated to be sufficiently suitable for correctly performing the sequence of spatial operations. For example, each spatial in the pool of spatial operations 162, may be associated with a pre-defined value indicating the maximum time-slot for that operation (e.g., tilting is allotted 1 second; rotating by 360 degrees is allotted 3 seconds; drawing an "U" figure in mid-air with the electronic device is allotted 2.5 seconds; or the like); and the timing module 163 may combine or add together the allotted time slots of each spatial operation in the sequence, in order to determine the aggregate time slot that would be allotted to performing the entire Spatial CAPTCHA challenge.

The electronic device may monitor and/or record and/or and track the spatial and three-dimensional properties of the electronic device via its sensors 151-157. A spatial sequence tracker/analyzer 164 may analyze the sensed data, to determine whether the requested three-dimensional operations were performed (at all, or partially, or accurately; or beyond a pre-defined minimum threshold of accuracy); and may utilize this determination in order to confirm that the user is indeed a human user, or conversely, in order to determine that the spatial CAPTCHA challenge has been failed (and should be re-run as a second chance or third chance, or should cause other consequences such as blocking the access of the user to a service, or requiring the user to perform additional authentication processes).

Optionally, a sufficient accuracy detector 165 may operate to determine that, even though a requested spatial sequence was not performed perfectly or exactly as required, the similarity between the actually-performed spatial sequence and the required (the challenge) spatial sequence is sufficient (e.g., beyond a pre-defined threshold value) in order to regard the actual performance as passing the spatial challenge. For example, the spatial challenge may require the user to draw a circle in mid-air using his smartphone; the user may draw 330 degrees of an entire circle, using his smartphone; and the sufficient accuracy detector 165 may determine that such actual performance suffices to pass the spatial challenge. Conversely, if the user draws in mid-air only a curve of 210 degrees, the sufficient accuracy detector 165 may determine that this is not sufficiently similar to the required spatial operation, and that the spatial challenge was not passed. Optionally, one or more ranges or threshold values may be used, for determining whether a spatial challenge was completed or passed (e.g., a threshold value of 300 degrees (or more) of an entire circle, in the above example of drawing an entire circle by moving the electronic device).

In a demonstrative embodiment, the electronic device that a user operates, and/or a computerized service that the user attempts to access or to operate, may request the user to perform one or more of these demonstrative spatial or three-dimensional operations, or a combination or set or ordered-sequence of the following spatial or three-dimensional operations: (a) tilt the electronic device K degrees towards the ground (or towards the sky, or towards the ceiling); (b) spin or rotate the electronic device K degrees (e.g., 90 degrees, or 180 degrees, or 45 degrees, or 360 degrees) clockwise (or counter-clockwise), about a particular axis of rotation (e.g., while the electronic device remains generally-parallel to the ground); (c) flip the electronic device over, to be upside-down, or to be positioned sideways (e.g., perpendicular to the ground); (d) spin or rotate the device counter-clockwise (or clockwise), an entire 360 degrees rotation, or a rotation of K degrees, or a pre-defined number of rotations (e.g., two full circular rotations); (e) rapidly shake the electronic device three times up-and-down; (f) tilt the electronic device to the right, then to the left, then to the right again (or other sequence of tilting directions); (g) gently and carefully throw or toss your device upwardly to the air and catch it again; (h) move the entire electronic device in the air to draw a pre-defined pattern or shape or letter or digit or character (e.g., draw the letter "U" in the air by moving the entire smartphone; draw the letter "V" in the air by moving the entire tablet; draw the digit "8" in the air by moving the smart-watch; draw a question mark character ("?") in the air using the smartphone; draw a triangle in the air by moving the tablet; draw a square in a counter-clockwise direction by moving the entire smartphone; or the like); (i) accelerate the electronic device upwardly, bring it to a stop, and then accelerate it downwardly (such as, by raising the smartphone rapidly 30 centimeters upwardly, then changing direction and bringing the smartphone rapidly 30 centimeters upwardly); (j) perform operations that change the altitude or location of the smartphone in particular manner or sequence (e.g., lift the smartphone 50 centimeters upwardly, then lower the smartphone 25 centimeters downwardly); and/or other suitable operations or combinations. The value of K may be a pre-defined value (e.g., 30 or 45 or 90 or 180 or 270 or 360 degrees), or may be a pseudo-random integer or number, or may be selected pseudo-randomly from a pool or list of possible K values (e.g., the pool containing the values of 45, 90, 180 and 360 degrees).

In some embodiments, the novel CAPTCHA mechanism may be implemented by the Spatial CAPTCHA Generator 161, able to select or define the requested spatial operation(s) that form the spatial CAPTCHA sequence; as well as the Spatial Sequence Tracker/Analyzer 164, able to track the spatial properties of the electronic device, log the changes in such spatial properties, and compare them to the requested Spatial CAPTCHA challenge that was requested of the user.

In some embodiments, the user may be allocated a pre-defined time period (e.g., ten or twenty or thirty seconds) to perform the requested operation(s); and the user would fail the challenge if the operation(s) are not performed within the allotted time-slot. The Timing Module 162, in association with a Real Time Clock (RTC) 166, may be responsible for setting or selecting or defining the maximum time that would be allotted for performing the spatial challenge; for monitoring or tracking or measuring the actual time that elapsed; and for determining whether or not the spatial challenge was performed within the allotted time-limit.

Optionally, a Spatial CAPTCHA Tolerance Modifier 167 may be utilized in order to fine-tune or configure or set or modify the tolerance level of the Spatial CAPTCHA system to real-life physical operations performed by the user; for example, enabling the service administrator to configure a 10% tolerance, such that a request to tilt the device by 90 degrees may be regarded as correctly fulfilled if the user actually tilts the device by 84 degrees or by 89 degrees or by 96 degrees. In some embodiments, the spatial challenge mechanism may be implemented in a manner that allows a system administrator to provide as input, an indication of the tolerance level that is permitted, thereby enabling the mechanism to be flexible or modular, to be stricter or more allowing, depending on the type of service that is about to be accessed, or depending on the type of operation that is about to be performed by the user. For example, a Spatial CAPTCHA challenge prior to performing a wire transfer in a banking website, may have less tolerance and may be stricter, compared to a spatial challenge that is used for allowing a user to download an audio file from an online music store.

In some embodiments, the tolerance level of the Spatial CAPTCHA may be configured with regard to a series of operations, allowing some tolerance in diverting from the requested set of operations, if part of the performed gestures appears to be in line with the requested sequence. For example, the Spatial CAPTCHA may require the user to perform a series of three operations (e.g., spin the device clockwise; flip over the device; shake the device), and the tolerance level may be configured such that if the user performs correctly at least two of the three operations, within a pre-defined time frame (e.g., within 20 seconds), in the correct order, then the challenge would be regarded as completed successfully.

In some embodiments, the requested Spatial Operations of the Spatial Challenge may be conveyed to the user by presenting a video-clip or animation of the required operations, with a short instruction of "please perform the spatial operations that are shown in the video/the animation", and without presenting textual instructions at all (or, in addition to textual instructions). The absence of textual instructions may further strengthen the Spatial CAPTCHA against computerized attempts to bypass it. In some embodiments, for example, each spatial operation in the Pool of spatial operations 162 may be associated with a pre-stored video or animation or image or audio-segment, which demonstrates or depicts or otherwise conveys instructions on how to perform the required spatial operation; and a Spatial Instructions Generator 168 may be used to stitch-together or to combine a sequence of the instructions segments (or instruction items) that correspond to the selected sequence of spatial operations that are required as the spatial challenge.

In some embodiments, the novel CAPTCHA mechanism may be utilized as augmenting a conventional CAPTCHA mechanism; for example, requesting the user to enter the text that is shown as a distorted image, and also to perform one or more spatial gestures on the computing device or electronic device; thereby strengthening the CAPTCHA mechanism against automated attempts to bypass it.

In some embodiments, the user may be able to select or to request, whether to use the Spatial CAPTCHA mechanism, instead of using a conventional text-based or audio-based CAPTCHA mechanism. For example, a user that is frustrated from trying to solve a visual CAPTCHA challenge of distorted text, may request the computerized service or website or application to present to him a Spatial Challenge instead.

Figure 3:
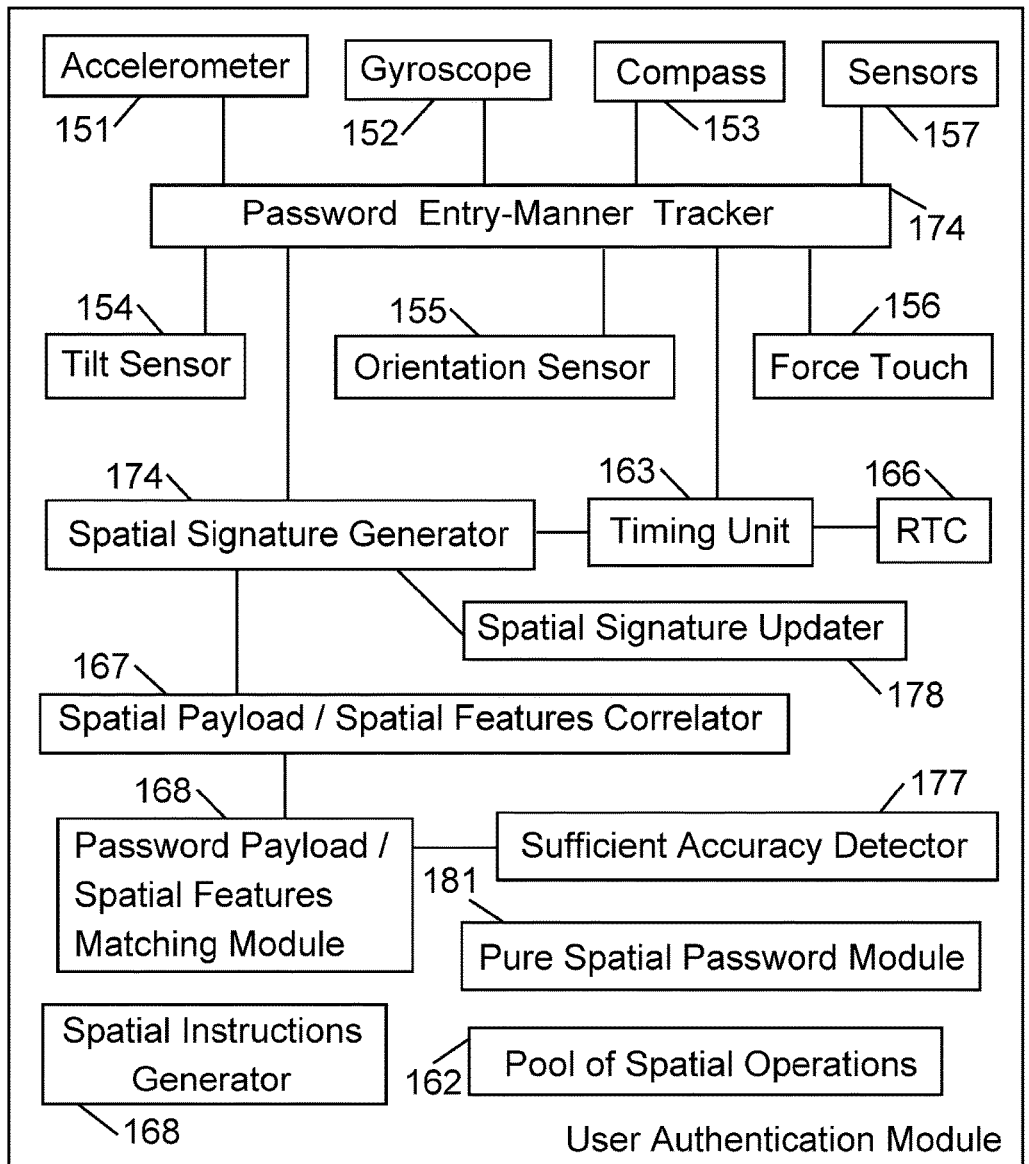
FIG. 3 is a schematic block-diagram illustration of another user authentication module, in accordance with some demonstrative embodiments of the present invention.

Reference is made to FIG. 3, which is a schematic block-diagram illustration of user authentication module 150B and its associated components, in accordance with some demonstrative embodiments of the present invention. The user authentication module 150B of FIG. 3 may be a demonstrative example of the user authentication module 150 of FIG. 1; or may be comprised in, or may operate in conjunction with, the user authentication module 150 of FIG. 1.

User authentication module 150B may enable a device or a system to authenticate a user based on, or by taking into account (e.g., as one authentication factor out of one or more authentication factors) a Spatial or Three-Dimensional Password.

The Applicants have realized that many users utilize an electronic device (such as a smartphone, a tablet, or other electronic device or computing device) in order to enter or submit user credentials or authentication data (e.g., username, password, PIN, pass-phrase, answers to security questions); and such electronic devices may comprise, for example, one or more accelerometers, one or more gyroscopes, one or more modules or elements able to determine position or orientation or direction of velocity or acceleration or deceleration of the device, or the like.

The Applicants have realized that it may be beneficial to define and/or utilize a spatial or three-dimensional password or pass-phrase or PIN or security response item or other challenge-response item, in a manner that includes both the content of the response (e.g., the password itself) as well as one or more characteristics of the computing device while the response is being entered; and to utilize such combined data for authentication purposes or for user-identification purposes or for user-differentiation purposes.

In a demonstrative implementation, the user authentication module 150B may comprise, or may operate in conjunction with, one or more sensors or components of the electronic device; for example, accelerometer 151, gyroscope 152, compass 153, tilt sensor 154, orientation sensor 155, and Force Touch touch-screen 156; other suitable types of sensors may be used, and they are depicted (and may be referred to) as sensors 157.

In some embodiments, an Initial Enrollment Module 171 may request a user to define a new password (e.g., upon creation of a new account). The user may utilize the electronic device in order to enter his new password (e.g., "swordfish"); and a Password Payload Module 172 may receive or capture the entered data, and may securely store it as a password of that user or username (e.g., in a password database; or, may store a hashed value of the entered password, or a salted and hashed value of the entered password). A Password Entry-Manner Tracker 173 may track and monitor the particular, user-specific, manner in which the particular user operates the device while, or immediately prior to, or immediately subsequent to, entering his password. For example, the Password Entry-Manner Tracker 173 may track or monitor or sense, by using one or more of the sensors 151-157, the spatial properties (or the modifications or changes to the spatial properties) of the electronic device, prior to and/or during and/or subsequent to the entry of the password by the user. For example, the Password Entry-Manner Tracker 173 track and monitor the acceleration, deceleration, velocity, tilt, orientation, spin, rotation, position, location, slanting, force applied, pressure applied, and/or other particular spatial characteristics of the electronic device.

A Spatial Signature Generator 174 may generate or may construct a user-specific signature, that describes, or reflects, or corresponds to, a sequence of spatial operations that the user performs during (and/or immediately before, and/or immediately after) entry of the password, or a sequence of spatial changes that the electronic device exhibits during (and/or immediately before, and/or immediately after) entry of the password. The generated Spatial Signature (or a hashed value thereof, or a salted and hashed value thereof) may be stored as an additional secret, or as part of a secret, that is associated with that user or username or account, and which may be used for user authentication, or as a user authentication factor, or as part of a user-authentication factor.

In some embodiments, the spatial signature may be generated immediately upon the first definition or creation of a new password by the user, or upon the first session in which the user is requested to create a new password (and optionally, to repeat or re-type it). In other embodiments, the spatial signature may be generated based on the first K sessions in which the user enters and/or defines his password, in order to extract the spatial gestures of the user are characteristic to that user and/or that repeat over such K sessions; and only from the K+1 session, the gesture or spatial data may be actually utilized as an additional secret or as a user-identifying feature.

For example, the system may monitor and track one or more spatial or spatial-related data items (e.g., device acceleration or deceleration; device orientation or position; accelerometer data or events; gyroscope data or events; touch-screen data or events; or the like), and may store them as part of a secret (e.g., a combined secret representation of password-and-spatial-data); thereby tailoring a password or pass-phrase or PIN to have biometric characteristics and/or user-specific characteristics and/or behavioral characteristics that may be unique (or may be known) only to the genuine user that defined the password, and not to an attacker who attempts to enter the same password without those additional characteristics.

In some implementations, a Password Payload/Spatial Features Correlator 175 may associate between (i) a particular gesture or sequence of gestures, or behavior, of the user while (or before, or after) he enters the password, or a spatial characteristic of the device being utilized, and (ii) a password being entered or being submitted for authentication; and may treat the combination of the password-and-gesture or password-and-device-data as a combined secret, for authentication purposes. Optionally, Timing Unit 163, in association with Real Time Clock (RTC) 166, may further provide data about the particular timing of spatial user gestures and/or spatial changes of the electronic device, and such timing characteristics may further be part of the combined secret (e.g., that the password is typically entered over a total time period of K milliseconds; that during the first 0.5 seconds of the password-entry process the user rotates the smartphone by 30 degrees clockwise; or the like).

Subsequently, when the user (the genuine user, or a human attacker, or an automated attacker or "bot" or script) attempts to re-enter the password, the user authentication module 150B may utilize a Password Payload/Spatial Features Matching Module 176 in order to take into account two factors in aggregate as a condition for authenticating the user: (I) whether the payload of the password is correct and matches the reference password pre-stored for that account or user or username, and also (II) whether the spatial features or the three-dimensional features of the electronic device, as currently tracked or as freshly tracked during (or immediately before, or immediately after) the fresh entry of the password, match (e.g., are identical to, or are sufficiently similar to) the reference Spatial Signature of the user, that was tracked and defined when the user had initially defined his password.

In a demonstrative implementation, the system may observe that the user defined his password (e.g., the word "swordfish") while holding the smartphone upside-down (e.g., the user is lying in bed on his back); or that the user tilted the smartphone about 30 degrees relative to a horizontal plane; and may add this as an additional characteristic for the manner of entering the password, as a condition for authentication and in addition to the actual matching of the content of the entered password. Accordingly, a subsequent user that would attempt to enter the payload of the password correctly ("swordfish"), but would do so while standing up and holding the smartphone at eye-level generally perpendicular to the ground, would fail the authentication attempt since the Spatial Signature of the device and/or of the user is not identical (and is not sufficiently similar to) the reference Spatial Signature.

In another implementation, the system may monitor and/or observe that the password was defined while utilizing one or more unique directions-of-movement, or angels, or spins, or tilting, or other device characteristics or user-behavior characteristics that may be utilize for establishing a 3D-signature, optionally associated with a timing scheme or timing representation (e.g., the user tilts the device clockwise while entering the first character of the password, and then after 0.5 seconds the user tilts the device counter-clockwise while entering the fifth character of the password, or the like). These user-specific characteristics may be extracted from the manner in which the user had entered his password, and may be used subsequently as an additional factor of user authentication; such that, not only the payload of the fresh password needs to match the payload of the reference password, but also, the manner-of-entry of the fresh password needs to match the historic or the original or the reference manner-of-entry of the original or historic password.

Accordingly, user authentication module 150B may authenticate a user (or, may deny access of a user to an account or a service; or may authorize or allow access of a user to an account or a service) by taking into account, in combination: (a) the content or "payload" of a password or PIN or pass-phrase or security-response; and/or (b) a three-dimensional gesture or movement or spatial-data that characterizes the manner in which the user enters his password; and/or (c) other three-dimensional or spatial-related data of the device (and not necessarily of the user), such as acceleration data or gyroscope data, during entry of such password; and/or (d) a timing scheme that associates a particular characteristic of the above, with a particular time-offset or point-in-time, or with a particular sequence or sequencing-scheme (e.g., firstly tilting the device towards a first direction, and then tilting the device or spinning the device towards a second direction).

In some embodiments, the above parameters may be observed and utilized not only (or not at all) with regard to the entry of the password; but rather, or instead, or in addition to it, immediately-before entry of the password and/or immediately-after entry of the password. For example, the system may enable a user to define a user-specific authentication sequence, in which the user: spins the device clockwise approximately 40 degrees, then enters the password, and then spins the device counter-clockwise approximately 90 degrees; or may allow the user to define other gestures or 3D-signatures or spatial information that may be monitored, collected and/or utilized prior to entry of the password, during the entry of the password, and/or subsequent to the entry of the password.

The Spatial Password mechanism of the present invention may be inserted or injected or added, for example, into a web-site, web-page, application, mobile application or "app", an online service, an electronic commerce site or service, an online banking service, a search engine, a web-page or service that enables a user to submit a query or to upload a file, a web-page or service that enables a user to download data or files, or the like.

In some embodiments, the user authentication module 150B may be configured to reduce friction of users that attempt to authenticate; for example, by allowing a user to pass authentication (e.g., to successfully log-in), even if some (bon not all) of the payload of the password matches the payload of the reference password, as long as the unique user-specific manner in which the user enters the fresh password is sufficiently matching to the historic or reference manner-of-entry of that user or account. For example, user Adam defines or creates his password "swordfish", while tilting his smartphone by 45 degrees and also accelerating his smartphone upwardly. Later, user Adam attempts to log-in to this account, but types incorrectly "swordfisj" (replacing the last "h" with a "j"), but while still performing the same sequence of spatial operations. The user authentication module 150B may be pre-configured, by a system administrator, to tolerate this slight or partial deviation in the payload of the password (e.g., a deviation or error that is smaller than a pre-defined value; such as, a mistake in only one or two or K characters of the payload), which is compensated by the correct performance of the unique user-specific manner of entry of the password.

Optionally, a sufficient accuracy detector 177 may operate to determine that, even though the fresh spatial sequence that is sensed when the user attempts to freshly enter a password, does not perfectly or exactly match the original or historic spatial sequence of features, the similarity between the actually-performed spatial sequence and the required (the reference) spatial sequence is sufficient (e.g., beyond a pre-defined threshold value) in order to regard the actual performance as passing. For example, the reference password had been defined by user Bob while he performed a rotation of his smartphone by 90 degrees clockwise; later, user Bob may enter the same password (the same payload), while also rotating his smartphone by 84 degrees clockwise; and the sufficient accuracy detector 177 may determine that such actual performance suffices to pass the spatial requirements, and that the fresh password can be regarded as if it was entered according to the required, historic, manner-of-entry. Conversely, if the user enters the password while also rotating his phone by only 45 degrees, the sufficient accuracy detector 177 may determine that this is not sufficiently similar to the required spatial features, and the user authentication may be declared to as failure or rejection. Optionally, one or more ranges or threshold values may be used, for determining whether the spatial signature matches or does not sufficiently match (e.g., a threshold value of 80 degrees (or more) of rotating the smartphone, in the above example).

In some embodiments, a Spatial Signature Updater 178 may continuously or periodically update the spatial signature that reflects the particular spatial features of the electronic device associated with the manner in which a password is entered. In the above example, the Spatial Signature Updater 178 may track and may determine that even though the initial, original, password ("swordfish") was defined by user Bob while rotating his smartphone by 90 degrees clockwise, in 6 subsequent log-in sessions (that were successful), user Bob has rotated his smartphone by only 80 degrees while also entering his password correctly. The Spatial Signature Updater 178 may learn, over such multiple iterations, that the spatial signature needs to be updated or adjusted, to reflect a clockwise rotation of 80 degrees instead of the original 90 degrees. The user need not be informed or notified of such updating, which may occur in the background and without the user's knowledge. Upon such updating of the spatial signature, the new value may be used for subsequent authentication sessions. Later, if user Bob rotates his smartphone by 77 degrees clockwise while entering his password, the user authentication module 150B may determine that the authentication is approved, since the fresh value (77 degrees) is sufficiently similar to close to the Updated spatial signature (80 degrees), even though the fresh value (77 value) may be insufficiently close to the original or historic spatial signature (90 degrees).

The present invention may further comprise embodiments in which a string-based password that the user is Null, or is skipped or discarded entirely; or is not entered at all by a user; such that, in some embodiments, only a three-dimensional spatial password is utilized for user authentication, instead of requiring the user to create or define a conventional password (e.g., a string of characters). Such embodiments of the present invention may thus utilize a Pure Spatial Password (or a purely spatial password), as an authentication factor for a user, or to otherwise confirm or affirm user identity; without the need to create and/or enter and/or submit a string of characters as a conventional password. This may be implemented, for example, by a Pure Spatial Password Module 181 which may be part of user authentication module 150, or may otherwise be associated with a computing platform, an electronic device, an online platform, or the like.

In a first set of embodiments that utilize a Pure Spatial Password, a user may create a new account or a new user profile; but instead of requiring the user to enter a user-selected string as a conventional password, the Pure Spatial Password Module 181 may skip such request, and may instead require the user to perform a sequence of spatial gestures with the electronic device and/or with an input unit of the electronic device. For example, the Pure Spatial Password Module 181 may generate a sequence of spatial operations or spatial gestures that will be regarded as user-specific combination, such as, by selecting discrete operations from pool of spatial operations 162; and a spatial instructions generator 168 may present to the user a set of spatial instructions requesting the user to perform that set or sequence of spatial operations. The spatial operations and/or their order or sequence, may be selected randomly or pseudo-randomly from the pool of spatial operations 162. For example, the Pure Spatial Password Module 181 may thus generate for the user a pseudo-random sequence of spatial operations, such as, "please lift your smartphone upwardly 40 centimeters; then rotate your smartphone by 180 degrees clockwise as if you are reading the screen upside-down; then shake your smartphone three times". The user may perform this sequence (one time, or multiple time), and the Pure Spatial Password Module 181 may verify that the user is capable of correctly performing the system-selected sequence of spatial operations. Then, the Pure Spatial Password Module 181 may inform or notify the user that this spatial sequence is the new "password" (or, password equivalent, or authentication factor) of the user. Optionally, the Pure Spatial Password Module 181 may ask the user whether the user agrees to utilize this sequence as a password replacement; or, whether the user prefers to utilize another, different, sequence of spatial operations that the Pure Spatial Password Module 181 would pseudo-randomly select for the user. Once the user approves that he is comfortable with using the spatial sequence, the Pure Spatial Password Module 181 may generate and store a Spatial Sequence Signature which corresponds to the spatial properties, or to the changes in spatial properties, of the electronic device while the Pure Spatial Password is performed by the user (optionally taking into account the particular user-specific variations of the particular user; such as, if the original spatial instruction was "please rotate your smartphone by 180 degrees", but the particular user has rotated his smartphone by 150 degrees across three repeated iterations, the Pure Spatial Password Module 181 may include in the spatial combination an indication of the actual spatial gesture (150 degrees) as performed by the particular user, and not the pre-selected spatial operation).

The Spatial Sequence Signature may be encrypted, hashed, salted, salted-and-hashed, stored, securely stored, and/or otherwise handled (e.g., securely transmitted to a remote location), and may be stored in association with the username or account-identifier of that user's account or profile. Subsequently, when a user attempts to authenticate or log-in into that account or profile, the Pure Spatial Password Module 181 may determine that no conventional password ("string" based password) exists or is required, and that a Pure Spatial Password is defined for that account; and may require the user to perform the particular sequence of spatial operations that had been defined as its spatial password.

In some embodiments, the Pure Spatial Password Module 181 does not present to the user any spatial instructions at this stage of user authentication, but rather, only requires the user to recall from his memory what the spatial sequence was and to perform it correctly. In other embodiments, the Pure Spatial Password Module 181 may provide initial or partial instructions to the user, such as, "Please perform the sequence of spatial operations that begin by shaking your smartphone three times". In yet other embodiments, the Pure Spatial Password Module 181 may provide partial or even full spatial instructions to the user that attempts to authenticate via the Spatial Password, and may authenticate (or reject, or block) the user based on identifying the particular user-specific manner that the current user utilizes to perform the requested sequence, based on its similarity to the previously-performed reference sequence that was performed when the spatial password was created or defined. For example, the formal instructions to the user that attempts to authenticate may be "Please rotate your smartphone by 180 degrees"; however, the Spatial Sequence Signature of the genuine user may indicate that the genuine user had performed a rotation of only 150 degrees for this spatial step, and therefore the Pure Spatial Password Module 181 may check whether the current user that attempts to authenticate similarly perform such 150 degrees rotation, and not the instructions-based 180 degrees rotation.

If the Pure Spatial Password Module 181 determines that the freshly-performed sequence of spatial operations or gestures, matches the original sequence of spatial operations as reflected in the Spatial Sequence Signature, then the Pure Spatial Password Module 181 declares that this user authentication factor is fulfilled or is passed successfully (such as, the user becomes authenticated if this is the single factor for authentication; or the system proceeds to utilize a second factor of user authentication if the Pure Spatial Password is one factor out of two-step or multiple-step authentication process).

In another set of demonstrative embodiments, instead of (or in addition to) utilizing the Pure Spatial Password Module 181 for the purpose of generating a system-selected pseudo-random sequence of spatial operations that is then proposed to the user as a new spatial password, the Pure Spatial Password Module 181 may propose to the user that the user himself would create his own sequence of spatial operations. For example, the Pure Spatial Password Module 181 may notify the user, "Please create your unique spatial password, by performing any sequence of spatial operations within the next five seconds, selected at your choice from the following list of spatial operations: tilt your smartphone by N degrees, rotate your smartphone by K degrees, shake your smartphone N times". The user may then proceed to create his own user-selected sequence of spatial operation, while the spatial sequence tracker/analyzer 164 monitors and records the spatial gestures or the changes in spatial properties of the electronic device, and the spatial signature generator 174 may then generate a Spatial Sequence Signature that reflects the unique user-specific sequence of spatial operations, and the particular manner in which the particular user performed it. This user-defined (and not system-selected) Spatial Sequence Signature may then be used by the system as a Pure Spatial Password, for user authentication purposes or as a user authentication factor.

In accordance with the present invention, a three-dimensional password or a spatial password or a gesture-based password, may be or may comprise, for example: (a) a secret sequence of spatial operations and/or spatial gestures that the user is required to perform, within a pre-defined timeframe and in a particular order; or, (b) a particular user-specific manner in which the user performs such secret sequence (e.g., the particular manner of user Bob who regularly rotates his smartphone by 160 degrees, even though the original definition of his password suggested to him to rotate the smartphone by 180 degrees); or, (c) the secret sequence of item (a) above, in combination with the payload or the actual string of a characters-based password (or a hashed value thereof); or, (d) the secret sequence of item (b) above, in combination with the payload or the actual string of a characters-based password (or a hashed value thereof).

It is noted that in accordance with the present invention, monitoring and/or analyzing of "user interactions" and/or "user gestures", may further comprise the monitoring and/or analyzing of interactions, gestures, and/or sensed data that is collected shortly before or immediately before the actual interaction, and/or interactions, gestures, and/or sensed data that is collected shortly after or immediately after the actual interaction; in addition to the data collected or sensed or monitored during the interaction itself.

It is noted that in accordance with the present invention, the "user interaction data" may comprise, for example, any data that is sensed or captured by the end-user device or by any sensors thereof or by other (e.g., external) sensors, and which may relate directly or indirectly to the user interaction or to the input-output exchange between the user and the device (or the service). For example, data sensed by the accelerometer and/or gyroscope(s) and/or orientation sensor(s) of the end-user device, during the interaction and/or shortly prior to the interaction and/or shortly after the interaction, may be utilized as part of the data from which a user-specific behavioral profile or cognitive biometric profile is generated; for example, identifying that user Adam typically orients his smartphone at a 30 degrees angle during the actual touch-screen interaction; identifying that user Bob typically rotates his smartphone clockwise by 20 degrees immediately prior to performing a touch-screen gestures; identifying that use Carl typically causes a movement sideways, or a movement to the left side, or a tilting to a certain direction, of the entire electronic device, prior to the interaction (the task performance) or immediately prior to it or immediately after it; or the like.

It is noted that in some embodiments, the user authentication or controlled access methods of the present invention, may optionally be used in conjunction with sensing and/or analyzing other user-specific features or biometric traits; for example, using an image or photo or video of the user (e.g., before or during or after the actual interaction is performed), or using an audio or speech utterance or voice utterance by the user (e.g., before or during or after the actual interaction is performed), face recognition, retina scanning, speech analysis, fingerprints, and/or other biometric features and/or user-specific characteristics. For example, the image or voice of the user, may be utilized as an assisting parameter in the decision whether or not the current user, who is performing the required task by interactions or gestures, is indeed the genuine user. For example, if the system of the present invention is utilized in order to authorize or reject the access of a user into a building or a vehicle, then utilization of the user's image and/or voice may further be used as part of the decision-making process in which the user is authenticated or is blocked.

The terms "mobile device" or "mobile electronic device" as used herein may include, for example, a smartphone, a cellular phone, a mobile phone, a smart-watch, a tablet, a handheld device, a portable electronic device, a portable gaming device, a portable audio/video player, an Augmented Reality (AR) device or headset or gear, a Virtual Reality (VR) device or headset or gear, or the like.

The term "pointing device" as used herein may include, for example, a mouse, a trackball, a pointing stick, a stylus, a joystick, a motion-sensing input device, a touch screen, a touch-pad, or the like.

The terms "device" or "electronic device" as used herein may include, for example, a mobile device, a non-mobile device, a non-portable device, a desktop computer, a workstation, a computing terminal, a laptop computer, a notebook computer, a netbook computer, a computing device associated with a mouse or a similar pointing accessory, a smartphone, a tablet, a smart-watch, and/or other suitable machines or devices.

The term "genuine user" as used herein may include, for example, an owner of a device; a legal or lawful user of a device; an authorized user of a device; a person who has legal authorization and/or legal right to utilize a device, for general purpose(s) and/or for one or more particular purpose(s); or the person who had originally defined user credentials (e.g., username and password) for performing an activity through the device.

The term "fraudulent user" as used herein may include, for example, any person who is not the "genuine user" of the device; an attacker; an intruder; a man-in-the-middle attacker; a man-in-the-browser attacker; an unauthorized user; an impersonator; a hacker; a cracker; a person attempting to hack or crack or compromise a security measure utilized by the device or by a system or a service or a website, or utilized by an activity or service accessible through the device; a fraudster; a human fraudster; a "bot" or a malware or an automated computerized process (e.g., implemented by using software modules and/or hardware components) which attempts to imitate human behavior or which attempts to act as if such "bot" or malware or process was the genuine user; or the like.

The present invention may be used in conjunction with various suitable devices and systems, for example, various devices that have a touch-screen; an ATM; a kiosk machine or vending machine that has a touch-screen; a touch-keyboard; a system that utilizes Augmented Reality (AR) components or AR glasses (e.g., Google Glass®); a device or system that may detect hovering gestures that do not necessarily touch on the screen or touch-screen; a hovering screen; a system or device that utilize brainwave analysis or brainwave control in which the user's brainwaves are captured or read and the user's brain may directly control an application on the mobile device; and/or other suitable devices or systems.

Some embodiments may identify multiple (different) users that utilize the same device, or the same account, before or after a typical user profile is built, or even during a training period in which the system learns the behavioral patterns. This may be used for detection of "friendly fraud" incidents, or identification of users for accountability purposes, or identification of the user that utilized a particular function in an Administrator account (e.g., optionally used in conjunction with a requirement that certain users, or users with certain privileges, may not share their password or credentials with any other person); or identification of a licensee in order to detect or prevent software piracy or unauthorized usage by non-licensee user(s), for software or products that are sold or licensed on a per-user basis or a per-seat basis.

Some embodiments may be utilized to identify or detect a remote access attacker, or an attacker or a user that utilizes a remote access channel to access (or to attack, or to compromise) a computerized service, or an attacker or cyber-attacker or hacker or impostor or imposter or "fraudster" that poses as a genuine user or as a true owner of an account, or an automatic script or "bot" or malware. Some embodiments may be used to differentiate or distinguish among, for example, an authorized or legitimate or genuine or human user, as opposed to an illegitimate and/or unauthorized and/or impostor human attacker or human user, and/or as opposed to a "bot" or automatic script or automated script or automated program or malware.

Some embodiments may be utilized for authenticating, or confirming the identity of, a user who is already logged-in or signed-in; or conversely, a user that did not perform (or did not yet perform, or did not complete) a log-in or sign-in process; or a user that did not successfully perform a log-in or sign-in process; or a user who is interacting with a computerized service prior to signing-in or logging in (e.g., filling-out fields in an electronic commerce website as part of checking-out as a guest), or during a log-in process, or after a log-in process; or to confirm the identity of a user who is already-logged-in, or who is not-yet logged-in, or who operates a system or service that does not necessarily require or utilize a log-in process.

Although portions of the discussion herein relate, for demonstrative purposes, to wired links and/or wired communications, some embodiments of the present invention are not limited in this regard, and may include one or more wired or wireless links, may utilize one or more components of wireless communication, may utilize one or more methods or protocols of wireless communication, or the like. Some embodiments may utilize wired communication and/or wireless communication.

The system(s) and/or device(s) of the present invention may optionally comprise, or may be implemented by utilizing suitable hardware components and/or software components; for example, processors, processor cores, Central Processing Units (CPUs), Digital Signal Processors (DSPs), circuits, Integrated Circuits (ICs), controllers, memory units, registers, accumulators, storage units, input units (e.g., touch-screen, keyboard, keypad, stylus, mouse, touchpad, joystick, trackball, microphones), output units (e.g., screen, touch-screen, monitor, display unit, audio speakers), acoustic microphone(s) and/or sensor(s), optical microphone(s) and/or sensor(s), laser or laser-based microphone(s) and/or sensor(s), wired or wireless modems or transceivers or transmitters or receivers, GPS receiver or GPS element or other location-based or location-determining unit or system, network elements (e.g., routers, switches, hubs, antennas), and/or other suitable components and/or modules.

The system(s) and/or devices of the present invention may optionally be implemented by utilizing co-located components, remote components or modules, "cloud computing" servers or devices or storage, client/server architecture, peer-to-peer architecture, distributed architecture, and/or other suitable architectures or system topologies or network topologies.

In accordance with embodiments of the present invention, calculations, operations and/or determinations may be performed locally within a single device, or may be performed by or across multiple devices, or may be performed partially locally and partially remotely (e.g., at a remote server) by optionally utilizing a communication channel to exchange raw data and/or processed data and/or processing results.

Some embodiments may be implemented by using a special-purpose machine or a specific-purpose device that is not a generic computer, or by using a non-generic computer or a non-general computer or machine. Such system or device may utilize or may comprise one or more components or units or modules that are not part of a "generic computer" and that are not part of a "general purpose computer", for example, cellular transceivers, cellular transmitter, cellular receiver, GPS unit, location-determining unit, accelerometer(s), gyroscope(s), device-orientation detectors or sensors, device-positioning detectors or sensors, or the like.

Some embodiments may be implemented as, or by utilizing, an automated method or automated process, or a machine-implemented method or process, or as a semi-automated or partially-automated method or process, or as a set of steps or operations which may be executed or performed by a computer or machine or system or other device.

Some embodiments may be implemented by using code or program code or machine-readable instructions or machine-readable code, which may be stored on a non-transitory storage medium or non-transitory storage article (e.g., a CD-ROM, a DVD-ROM, a physical memory unit, a physical storage unit), such that the program or code or instructions, when executed by a processor or a machine or a computer, cause such processor or machine or computer to perform a method or process as described herein. Such code or instructions may be or may comprise, for example, one or more of: software, a software module, an application, a program, a subroutine, instructions, an instruction set, computing code, words, values, symbols, strings, variables, source code, compiled code, interpreted code, executable code, static code, dynamic code; including (but not limited to) code or instructions in high-level programming language, low-level programming language, object-oriented programming language, visual programming language, compiled programming language, interpreted programming language, C, C++, C#, Java, JavaScript, SQL, Ruby on Rails, Go, Cobol, Fortran, ActionScript, AJAX, XML, JSON, Lisp, Eiffel, Verilog, Hardware Description Language (HDL, BASIC, Visual BASIC, Matlab, Pascal, HTML, HTML5, CSS, Perl, Python, PHP, machine language, machine code, assembly language, or the like.

Discussions herein utilizing terms such as, for example, "processing", "computing", "calculating", "determining", "establishing", "analyzing", "checking", "detecting", "measuring", or the like, may refer to operation(s) and/or process(es) of a processor, a computer, a computing platform, a computing system, or other electronic device or computing device, that may automatically and/or autonomously manipulate and/or transform data represented as physical (e.g., electronic) quantities within registers and/or accumulators and/or memory units and/or storage units into other data or that may perform other suitable operations.

Some embodiments of the present invention may perform steps or operations such as, for example, "determining", "identifying", "comparing", "checking", "querying", "searching", "matching", and/or "analyzing", by utilizing, for example: a pre-defined threshold value to which one or more parameter values may be compared; a comparison between (i) sensed or measured or calculated value(s), and (ii) pre-defined or dynamically-generated threshold value(s) and/or range values and/or upper limit value and/or lower limit value and/or maximum value and/or minimum value; a comparison or matching between sensed or measured or calculated data, and one or more values as stored in a look-up table or a legend table or a legend list or a database of possible values or ranges; a comparison or matching or searching process which searches for matches and/or identical results and/or similar results among multiple values or limits that are stored in a database or look-up table; utilization of one or more equations, formula, weighted formula, and/or other calculation in order to determine similarity or a match between or among parameters or values; utilization of comparator units, lookup tables, threshold values, conditions, conditioning logic, Boolean operator(s) and/or other suitable components and/or operations.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments", "some embodiments", and/or similar terms, may indicate that the embodiment(s) so described may optionally include a particular feature, structure, or characteristic, but not every embodiment necessarily includes the particular feature, structure, or characteristic. Furthermore, repeated use of the phrase "in one embodiment" does not necessarily refer to the same embodiment, although it may. Similarly, repeated use of the phrase "in some embodiments" does not necessarily refer to the same set or group of embodiments, although it may.

As used herein, and unless otherwise specified, the utilization of ordinal adjectives such as "first", "second", "third", "fourth", and so forth, to describe an item or an object, merely indicates that different instances of such like items or objects are being referred to; and does not intend to imply as if the items or objects so described must be in a particular given sequence, either temporally, spatially, in ranking, or in any other ordering manner.

Some embodiments may be used in, or in conjunction with, various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, a tablet, an on-board device, an off-board device, a hybrid device, a vehicular device, a non-vehicular device, a mobile or portable device, a consumer device, a non-mobile or non-portable device, an appliance, a wireless communication station, a wireless communication device, a wireless Access Point (AP), a wired or wireless router or gateway or switch or hub, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), or the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA or handheld device which incorporates wireless communication capabilities, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may comprise, or may be implemented by using, an "app" or application which may be downloaded or obtained from an "app store" or "applications store", for free or for a fee, or which may be pre-installed on a computing device or electronic device, or which may be otherwise transported to and/or installed on such computing device or electronic device.

In some embodiments, a method comprises: (A) determining whether a user of an electronic device is (i) a human user, or (ii) a non-human user; by performing: (a) generating a spatial challenge that requires the user to cause a particular sequence of spatial changes to spatial properties of the electronic device; (b) sensing and tracking actual spatial changes to the spatial properties of the electronic device; (c) if the actual spatial changes to the spatial properties of the electronic device that are sensed in step (b), match the particular sequence of spatial changes that were required in the spatial challenge of step (b), then determining that the user of the electronic device is a human user.

In some embodiments, a method comprises: (d) if the actual spatial changes to the spatial properties of the electronic device that are sensed in step (b), do not match the particular sequence of spatial changes that were required in the spatial challenge of step (b), then determining that the user of the electronic device is a non-human user.

In some embodiments, a method comprises: defining a level-of-tolerance associated with analysis of spatial changes of the electronic device; based on the defined level-of-tolerance, determining whether the actual spatial changes to the spatial properties of the electronic device that are sensed in step (b), sufficiently match the particular sequence of spatial changes that were required in the spatial challenge of step (b).

In some embodiments, generating the spatial challenge comprises: generating a spatial challenge that requires to virtually draw a particular shape in space by moving in space an entirety of the electronic device.

In some embodiments, generating the spatial challenge comprises: generating a spatial challenge that requires to rotate the electronic device at a particular rotation manner.

In some embodiments, generating the spatial challenge comprises: generating a spatial challenge that requires to tilt the electronic device at a particular tilting angle.

In some embodiments, generating the spatial challenge comprises: generating a spatial challenge that requires to accelerate the electronic device at a particular acceleration.

In some embodiments, generating the spatial challenge comprises: generating a spatial challenge that requires to shake the electronic device at a particular shake pattern.

In some embodiments, generating the spatial challenge comprises: generating a spatial challenge that requires to move the electronic device to a particular direction.

In some embodiments, generating the spatial challenge comprises: constructing, from a pool of discrete spatial operations, a particular sequence of two or more selected discrete spatial operations.

In some embodiments, generating the spatial challenge comprises: constructing, from a pool of discrete spatial operations, a particular sequence of two or more selected discrete spatial operations; wherein the pool of discrete spatial operations comprise at least one or more of: tilting the electronic device, rotating the electronic device, accelerating the electronic device, lifting the electronic device, lowering the electronic device, orienting the electronic device, shaking the electronic device.

In some embodiments, generating the spatial challenge comprises: allocating a maximum time-slot for performance of the spatial challenge.

In some embodiments, generating the spatial challenge comprises: constructing, from a pool of discrete spatial operations, a particular sequence of two or more selected discrete spatial operations, wherein each discrete spatial operation is associated with a time-slot for completion of said discrete spatial operation; allocating a maximum time-slot for performance of the spatial challenge, based on the aggregate sum of time-slots for completion of the discrete spatial operations that are comprised in the constructed spatial challenge.

In some embodiments, a method comprises: generating the spatial challenge in response to an attempt of a user to perform at least one of: accessing a particular web-page, submitting a query, downloading a content-item.

In some embodiments, a system comprises: a hardware processor able to execute code; an accelerometer able to sense acceleration data of an electronic device; a gyroscope able to sense orientation data of said electronic device; a three-dimensional spatial CAPTCHA module to generate a spatial challenge for distinguishing between a human user and a machine, by requiring a user of the electronic device to perform a particular sequence of spatial operations with the electronic device, that can be sensed by at least one of said accelerometer and said gyroscope.

In some embodiments, the three-dimensional spatial CAPTCHA module is to generate said spatial challenge by pseudo-randomly selecting a plurality of discrete spatial operations from a pool of pre-defined spatial operations.

In some embodiments, the three-dimensional spatial CAPTCHA module is to generate said spatial challenge by: (i) pseudo-randomly selecting a plurality of discrete spatial operations from a pool of pre-defined spatial operations, and (ii) allocating a time-frame for performing said particular sequence of spatial operations.

In some embodiments, the three-dimensional spatial CAPTCHA module is to monitor sensed device-acceleration data and sensed device-orientation data; and to determine, based on at least one of the sensed device-acceleration data and the sensed device-orientation data, whether or not the user successfully performed said particular sequence of spatial operations with the electronic device.

In some embodiments, the electronic device comprises a device selected from the group consisting of: a smartphone, a tablet, a smart-watch.

In some embodiments, a portable electronic device comprises: a hardware processor able to execute code; an accelerometer able to sense acceleration data of the portable electronic device; a gyroscope able to sense orientation data of the portable electronic device; a three-dimensional spatial CAPTCHA module, which is internal to said portable electronic device, to generate a spatial challenge for distinguishing between a human user and a machine, by requiring a user of the portable electronic device to perform a particular sequence of spatial operations with the portable electronic device, that can be sensed by at least one of said accelerometer and said gyroscope.

In some embodiments, a method comprises: (a) generating a spatial sequence signature that corresponds to a sequence of particular spatial operations, that are performed by a human user on an entirety of an electronic device; (b) subsequently, requesting from a subsequent user to perform a set of spatial operations as a user authentication factor; (c) while said subsequent user performs spatial operations via said electronic device, sensing spatial changes in spatial properties of said electronic device; (d) if the sensed spatial changes in spatial properties of the electronic device, that are sensed while the subsequent user performs spatial operations, match said spatial sequence signature, then determining that said subsequent user is authenticated as said human user.

In some embodiments, step (a) of generating the spatial sequence signature comprises: constructing, from a pool of discrete spatial operations, a particular sequence of two or more selected discrete spatial operations.

In some embodiments, generating the spatial sequence signature comprises: constructing, from a pool of discrete spatial operations, a particular sequence of two or more selected discrete spatial operations; wherein the pool of discrete spatial operations comprise at least one of: tilting the electronic device, rotating the electronic device, accelerating the electronic device, lifting the electronic device, lowering the electronic device, orienting the electronic device, shaking the electronic device.

In some embodiments, generating the spatial sequence signature comprises: tracking spatial gestures that the human user performs on said electronic device for a pre-defined time period; based on the tracked spatial gestures, generating said spatial sequence signature for said human user.

In some embodiments, generating the spatial sequence signature comprises: tracking spatial gestures that the human user performs on said electronic device for a pre-defined time period; based on the tracked spatial gestures, generating said spatial sequence signature for said human user; wherein the spatial gestures that the human user performs on said electronic device, and that are utilized for generating the spatial sequence signature, comprise one or more spatial operations selected from the group consisting of: tilting the electronic device, rotating the electronic device, accelerating the electronic device, lifting the electronic device, lowering the electronic device, orienting the electronic device, shaking the electronic device.

In some embodiments, step (a) comprises: generating a spatial sequence signature that corresponds to a sequence of particular spatial operations, that are performed by said human user on an entirety of an electronic device, and that can be measured by an accelerometer of said electronic device; wherein step (c) comprises: while said subsequent user performs spatial operations via said electronic device, sensing via said accelerometer spatial changes in spatial properties of said electronic device; wherein step (d) comprises: if the sensed spatial changes in spatial properties of the electronic device, that are sensed by said accelerometer while the subsequent user performs spatial operations, match said spatial sequence signature, then determining that said subsequent user is authenticated as said human user.

In some embodiments, step (a) comprises: generating a spatial sequence signature that corresponds to a sequence of particular spatial operations, that are performed by said human user on an entirety of an electronic device, and that can be measured by a gyroscope of said electronic device; wherein step (c) comprises: while said subsequent user performs spatial operations via said electronic device, sensing via said gyroscope spatial changes in spatial properties of said electronic device; wherein step (d) comprises: if the sensed spatial changes in spatial properties of the electronic device, that are sensed by said gyroscope while the subsequent user performs spatial operations, match said spatial sequence signature, then determining that said subsequent user is authenticated as said human user.

In some embodiments, step (a) comprises: generating a spatial sequence signature that corresponds to a sequence of particular spatial operations, that are performed by said human user on an entirety of an electronic device, and that can be measured by a device-orientation sensor of said electronic device; wherein step (c) comprises: while said subsequent user performs spatial operations via said electronic device, sensing via said device-orientation sensor spatial changes in spatial properties of said electronic device; wherein step (d) comprises: if the sensed spatial changes in spatial properties of the electronic device, that are sensed by said device-orientation sensor while the subsequent user performs spatial operations, match said spatial sequence signature, then determining that said subsequent user is authenticated as said human user.

In some embodiments, step (a) comprises: generating a spatial sequence signature that corresponds to a sequence of particular spatial operations, that are performed by said human user on an entirety of an electronic device, and that can be measured by a device-tilt sensor of said electronic device; wherein step (c) comprises: while said subsequent user performs spatial operations via said electronic device, sensing via said device-tilt sensor spatial changes in spatial properties of said electronic device; wherein step (d) comprises: if the sensed spatial changes in spatial properties of the electronic device, that are sensed by said device-tilt sensor while the subsequent user performs spatial operations, match said spatial sequence signature, then determining that said subsequent user is authenticated as said human user.

In some embodiments, a system comprises: a hardware processor able to execute code; an accelerometer able to sense acceleration data of an electronic device; a gyroscope able to sense orientation data of said electronic device; a pure spatial password module to define a pure spatial user password that requires a user of the electronic device to perform a particular sequence of spatial operations with the electronic device, that can be sensed by at least one of said accelerometer and said gyroscope, as a user-authentication factor.

In some embodiments, the pure spatial password module is to monitor sensed device-acceleration data and sensed device-orientation data; and to determine, based on at least one of the sensed device-acceleration data and the sensed device-orientation data, whether or not the user successfully performed said particular sequence of spatial operations with the electronic device.

In some embodiments, a process comprises: (a) requesting a user to define a password for user-authentication purposes; (b) receiving from the user, via an electronic device that the user operates, an input indicating a user-selected string for said password; (c) while the user enters said string via the electronic device in step (b), sensing spatial changes in spatial properties of said electronic device; (d) generating a combined secret, that is based on: (i) said user-selected string, and also (ii) said spatial changes in spatial properties of said electronic device that were sensed while the user entered said string.

In some embodiments, the process comprises: (e) subsequently, in a fresh user-authentication attempt, determining whether or not a current user is authenticated, based on both (I) whether a freshly-entered string matches the user-selected string, and also (II) whether fresh spatial changes to the electronic device during string entry match the sensed spatial changes of step (c).

In some embodiments, the sensing of step (c) comprises sensing changes in accelerometer data during entry of said user-selected string; wherein a user is subsequently authenticated by taking into account whether fresh changes in accelerometer data, measured during fresh entry of user password, match previously-sensed changes in accelerometer data during password creation.

In some embodiments, the sensing of step (c) comprises sensing changes in gyroscope data during entry of said user-selected string; wherein a user is subsequently authenticated by taking into account whether fresh changes in gyroscope data, measured during fresh entry of user password, match previously-sensed changes in gyroscope data during password creation.

In some embodiments, the sensing of step (c) comprises sensing changes in device-orientation data during entry of said user-selected string; wherein a user is subsequently authenticated by taking into account whether fresh changes in device-orientation data, measured during fresh entry of user password, match previously-sensed changes in device-orientation data during password creation.

In some embodiments, the sensing of step (c) comprises sensing changes in device-tilt data during entry of said user-selected string; wherein a user is subsequently authenticated by taking into account whether fresh changes in device-tilt data, measured during fresh entry of user password, match previously-sensed changes in device-tilt data during password creation.

In some embodiments, the process comprises: (e) subsequently, in a fresh user-authentication attempt, receiving a fresh input that a current user enters as the password, and tracking current spatial changes in spatial properties of the electronic device while the current user enters the fresh input; (f) if both: (A) the fresh input of step (e) matches the user-selected string of step (b), and also (B) the current spatial changes in spatial properties of the electronic device in step (e) match the sensed spatial changes in step (c), then determining that the fresh user is authenticated.

In some embodiments, the process comprises: (e) subsequently, in a fresh user-authentication attempt, receiving a fresh input that a current user enters as the password, and tracking current spatial changes in spatial properties of the electronic device while the current user enters the fresh input; (f) if (A) the fresh input of step (e) matches the user-selected string of step (b), but (B) the current spatial changes in spatial properties of the electronic device in step (e) does not match the sensed spatial changes in step (c), then rejecting the fresh user-authentication attempt.

In some embodiments, the process comprises: (e) subsequently, in a fresh user-authentication attempt, receiving a fresh input that a current user enters as the password, and tracking current spatial changes in spatial properties of the electronic device while the current user enters the fresh input; (f) if both: (A) the fresh input of step (e) matches a part but not all of the user-selected string of step (b), and also (B) the current spatial changes in spatial properties of the electronic device in step (e) match the sensed spatial changes in step (c), then determining that the fresh user is authenticated.

Functions, operations, components and/or features described herein with reference to one or more embodiments of the present invention, may be combined with, or may be utilized in combination with, one or more other functions, operations, components and/or features described herein with reference to one or more other embodiments of the present invention. The present invention may comprise any possible combinations, re-arrangements, assembly, re-assembly, or other utilization of some or all of the modules or functions or components that are described herein, even if they are discussed in different locations or different chapters of the above discussion, or even if they are shown across different drawings or multiple drawings.

While certain features of some demonstrative embodiments of the present invention have been illustrated and described herein, various modifications, substitutions, changes, and equivalents may occur to those skilled in the art. Accordingly, the claims are intended to cover all such modifications, substitutions, changes, and equivalents.

What is claimed is:

1. A method comprising:
   determining whether a user of an electronic device is (i) a human user, or (ii) a non-human user; by performing:
   (a) generating a spatial challenge that requires the user to cause a particular sequence of spatial changes to spatial properties of the electronic device;
   wherein generating the spatial challenge comprises:
   constructing, from a pool of discrete spatial operations, a particular sequence of two or more selected discrete spatial operations, wherein each discrete spatial operation is associated with a time-slot for completion of said discrete spatial operation;
   allocating a maximum time-slot for performance of the spatial challenge, based on the aggregate sum of time-slots for completion of the discrete spatial operations that are comprised in the constructed spatial challenge;
   (b) sensing and tracking actual spatial changes to the spatial properties of the electronic device;
   (c) if the actual spatial changes to the spatial properties of the electronic device that are sensed in step (b), match the particular sequence of spatial changes that were required in the spatial challenge of step (b), then determining that the user of the electronic device is a human user.

2. The method of claim 1, comprising:
   (d) if the actual spatial changes to the spatial properties of the electronic device that are sensed in step (b), do not match the particular sequence of spatial changes that were required in the spatial challenge of step (b), then determining that the user of the electronic device is a non-human user.

3. The method of claim 1, comprising:
   defining a level-of-tolerance associated with analysis of spatial changes of the electronic device;
   based on the defined level-of-tolerance, determining whether the actual spatial changes to the spatial properties of the electronic device that are sensed in step (b), sufficiently match the particular sequence of spatial changes that were required in the spatial challenge of step (b).

4. The method of claim 1, wherein generating the spatial challenge comprises:
   generating a spatial challenge that requires to virtually draw a particular shape in space by moving in space an entirety of the electronic device.

5. The method of claim 1, wherein generating the spatial challenge comprises:
   generating a spatial challenge that requires to rotate the electronic device at a particular rotation manner.

6. The method of claim 1, wherein generating the spatial challenge comprises:
   generating a spatial challenge that requires to tilt the electronic device at a particular tilting angle.

7. The method of claim 1, wherein generating the spatial challenge comprises:
   generating a spatial challenge that requires to accelerate the electronic device at a particular acceleration.

8. The method of claim 1, wherein generating the spatial challenge comprises:
   generating a spatial challenge that requires to shake the electronic device at a particular shake pattern.

9. The method of claim 1, wherein generating the spatial challenge comprises:
   generating a spatial challenge that requires to move the electronic device to a particular direction.

10. The method of claim 1,
    wherein the pool of discrete spatial operations comprises at least one of:
    tilting the electronic device,
    rotating the electronic device,
    accelerating the electronic device,
    lifting the electronic device,
    lowering the electronic device,
    orienting the electronic device,
    shaking the electronic device.

11. The method of claim 1, comprising:
    generating the spatial challenge in response to an attempt of the user to perform at least one of: accessing a particular web-page, submitting a query, downloading a content-item.

* * * * *